United States Patent
Ishikawa et al.

(10) Patent No.: US 12,386,110 B2
(45) Date of Patent: Aug. 12, 2025

(54) PHOTODETECTION DEVICE, PHOTODETECTION SYSTEM, AND FILTER ARRAY

(71) Applicant: Panasonic Intellectual Property Management Co., Ltd., Osaka (JP)

(72) Inventors: Atsushi Ishikawa, Osaka (JP); Yasuhisa Inada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 607 days.

(21) Appl. No.: 17/378,814

(22) Filed: Jul. 19, 2021

(65) Prior Publication Data
US 2021/0341657 A1 Nov. 4, 2021

Related U.S. Application Data

(63) Continuation of application No. PCT/JP2020/002755, filed on Jan. 27, 2020.

(30) Foreign Application Priority Data

Mar. 6, 2019 (JP) ................................ 2019-040847

(51) Int. Cl.
G02B 5/20 (2006.01)
G01J 3/26 (2006.01)
G02B 5/28 (2006.01)

(52) U.S. Cl.
CPC ................ G02B 5/201 (2013.01); G01J 3/26 (2013.01); G02B 5/28 (2013.01)

(58) Field of Classification Search
CPC .............. G02B 5/201; G02B 5/28; G01J 3/26
(Continued)

(56) References Cited

U.S. PATENT DOCUMENTS 4,501,470 A * 2/1985 Yeh ..................... G02B 5/206
359/887
6,081,379 A * 6/2000 Austin .................. G02B 5/284
359/590
(Continued)

FOREIGN PATENT DOCUMENTS

DE 10318767 A1 12/2004
DE 102006039071 A1 2/2008
(Continued)

OTHER PUBLICATIONS

The Extended European Search Report dated Mar. 29, 2022 for the related European Patent Application No. 20765826.1.
(Continued)

*Primary Examiner* — Audrey Y Chang
(74) *Attorney, Agent, or Firm* — Rimon P.C.

(57) ABSTRACT

A photodetection device includes: a filter array including a plurality of filters arranged in a two-dimensional array, the plurality of filters including a first filter and a second filter, the first filter and the second filter each including a first reflective layer, a second reflective layer, and an intermediate layer between the first reflective layer and the second reflective layer and having a resonant structure having a plurality of resonant modes differing in order from each other, at least one selected from the group consisting of a refractive index and a thickness of the intermediate layer of the first filter being different from the at least one selected from the group consisting of a refractive index and a thickness of the intermediate layer of the second filter; and an image sensor disposed at a position where the image senor receives light having passed through the filter array.

11 Claims, 25 Drawing Sheets

(58) Field of Classification Search
USPC .......................... 359/578, 586, 587, 588, 589
See application file for complete search history.

(56) References Cited

U.S. PATENT DOCUMENTS

| | | | | |
|---|---|---|---|---|
| 6,301,042 | B1* | 10/2001 | Pelekhaty | ............... G02B 5/281 |
| | | | | 359/359 |
| 7,521,666 | B2* | 4/2009 | Tsang | .................... G02B 5/288 |
| | | | | 359/359 |
| 2004/0155154 | A1* | 8/2004 | Topping | ................. G01K 11/14 |
| | | | | 374/E11.02 |
| 2008/0042782 | A1 | 2/2008 | Wang et al. | |
| 2011/0043823 | A1 | 2/2011 | Hillmer et al. | |
| 2011/0124966 | A1* | 5/2011 | Uzawa | ................. A61B 1/0638 |
| | | | | 359/578 |
| 2014/0071534 | A1* | 3/2014 | Nagato | ............ G02F 1/133514 |
| | | | | 359/589 |
| 2016/0138975 | A1 | 5/2016 | Ando et al. | |
| 2017/0005132 | A1 | 1/2017 | Vereecke et al. | |
| 2017/0243912 | A1* | 8/2017 | Kaneda | ............ H01L 27/14647 |
| 2018/0170093 | A1* | 6/2018 | Najiminaini | ........... B42D 25/29 |
| 2021/0341657 | A1 | 11/2021 | Ishikawa et al. | |

FOREIGN PATENT DOCUMENTS

| | | |
|---|---|---|
| JP | 2013-512445 | 4/2013 |
| JP | 2015-501432 | 1/2015 |
| WO | 1999/036811 A1 | 7/1999 |
| WO | 2009/151700 A1 | 12/2009 |
| WO | 2011/064403 | 6/2011 |
| WO | 2013/064510 | 5/2013 |
| WO | 2020/179282 A1 | 9/2020 |

OTHER PUBLICATIONS

Naba Kishore Sahoo et al: "Postanalyses of an optical multilayer interference filter using numerical reverse synthesis and Rutherford backscattering spectrometry", Applird Optics, Optical Society of America, Washington, DC, US, vol. 52, No. 10, Apr. 1, 2013 (Apr. 1, 2013), pp. 2102-2115, XP001581439, ISSN: 0003-6935, DOI: HTTP://DX.DOI.ORG/10.1364/AO.52.002102.
International Search Report of PCT application No. PCT/JP2020/002755 dated Mar. 10, 2020.

* cited by examiner

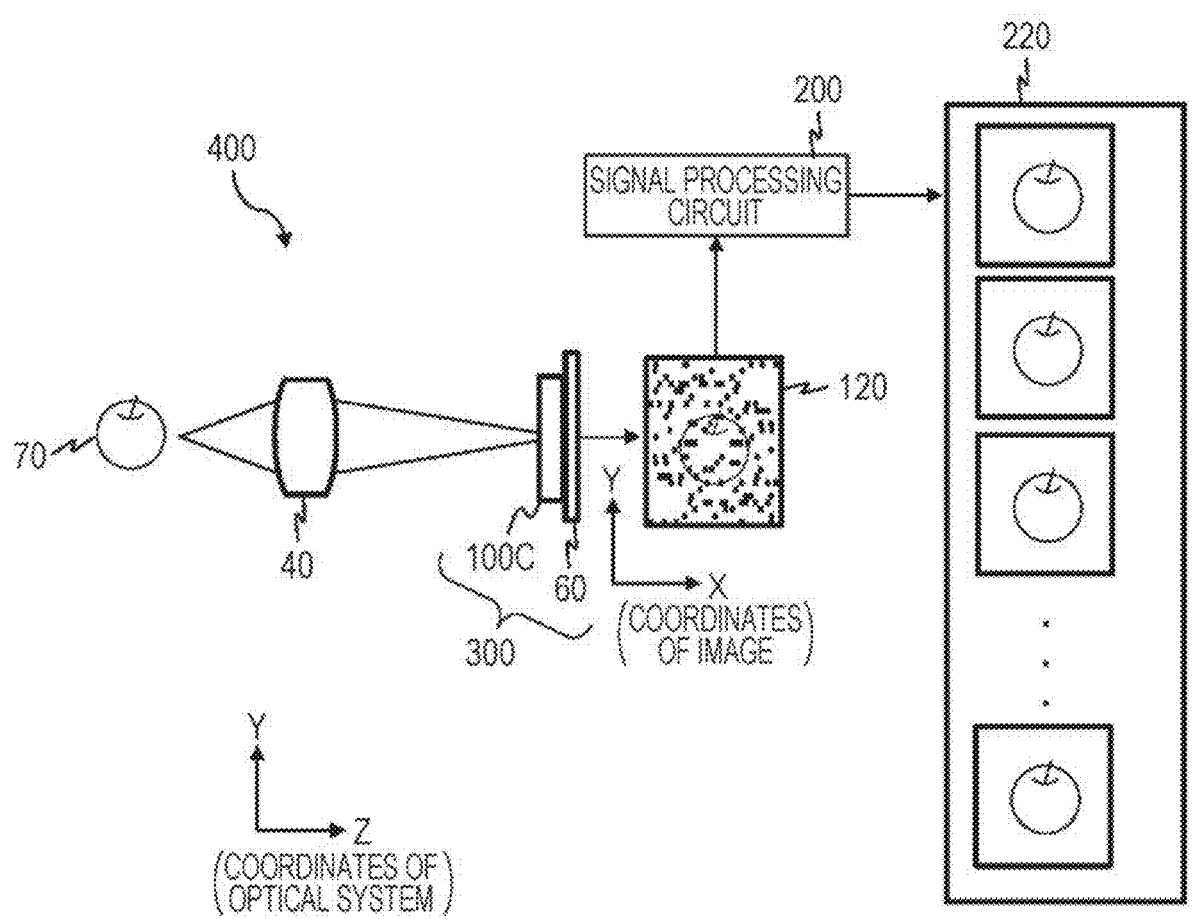

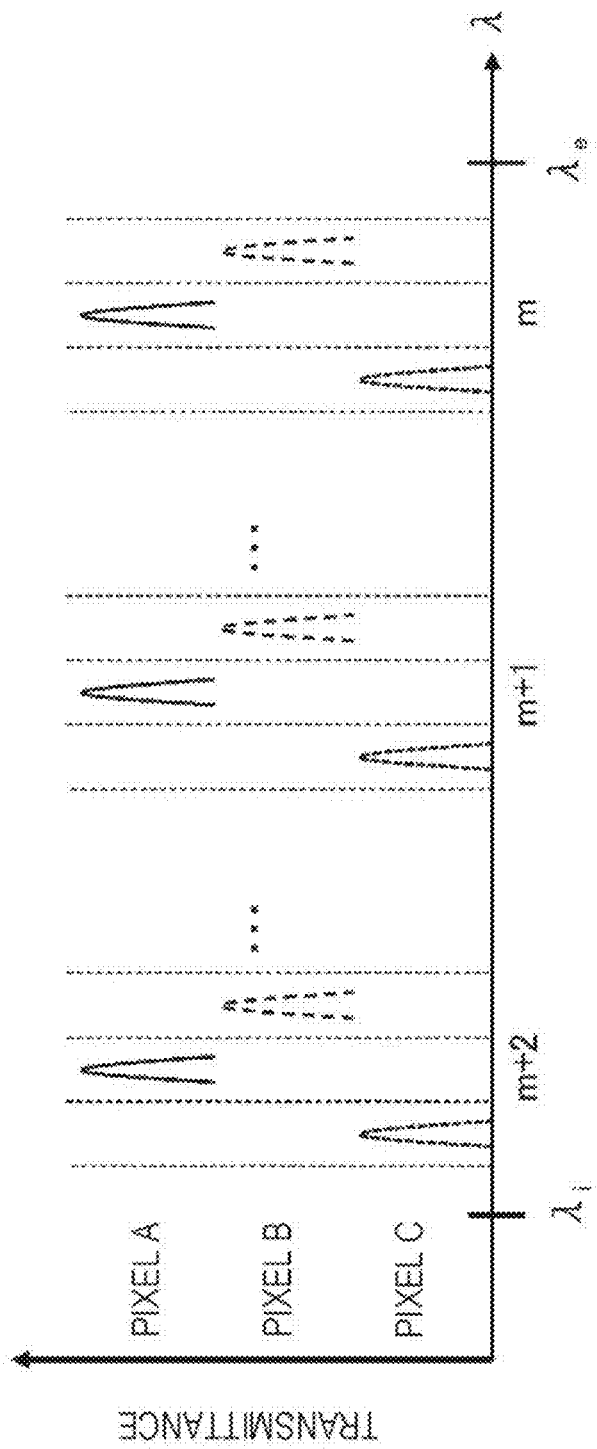

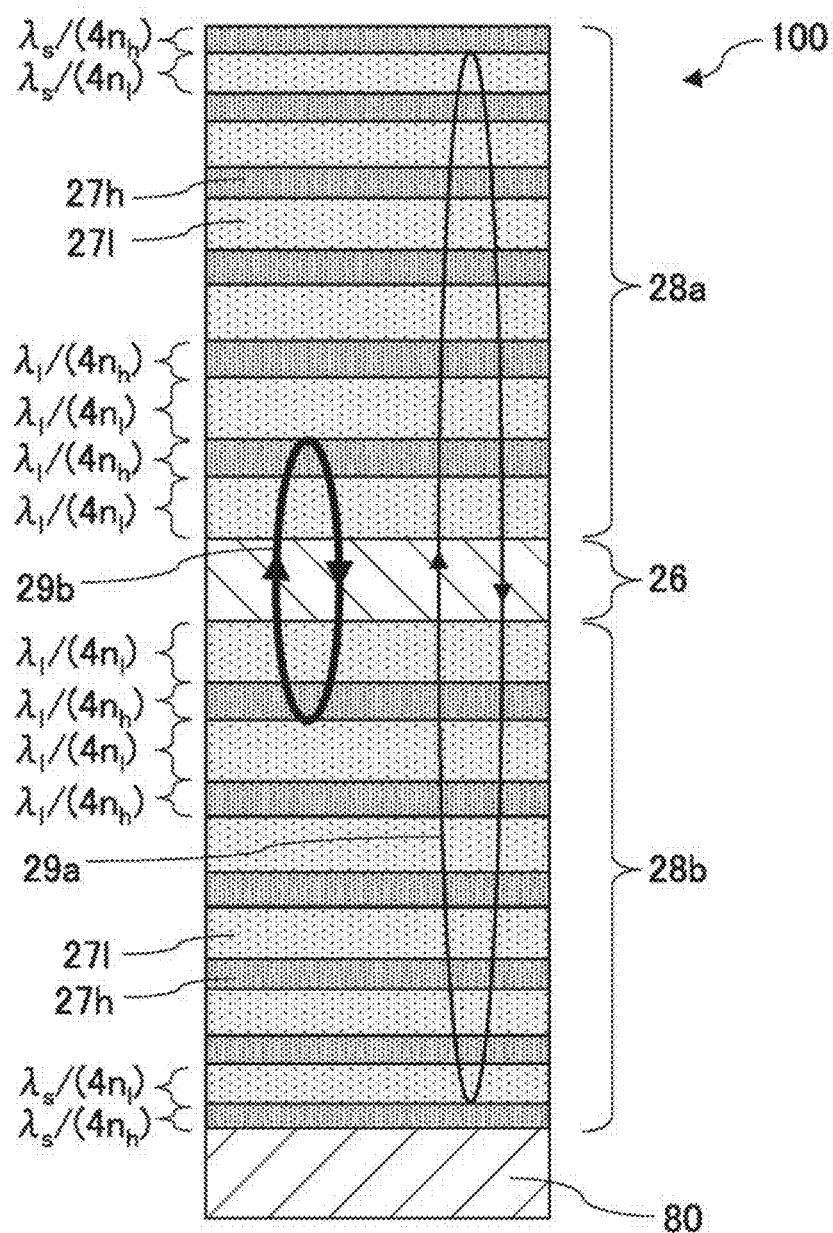

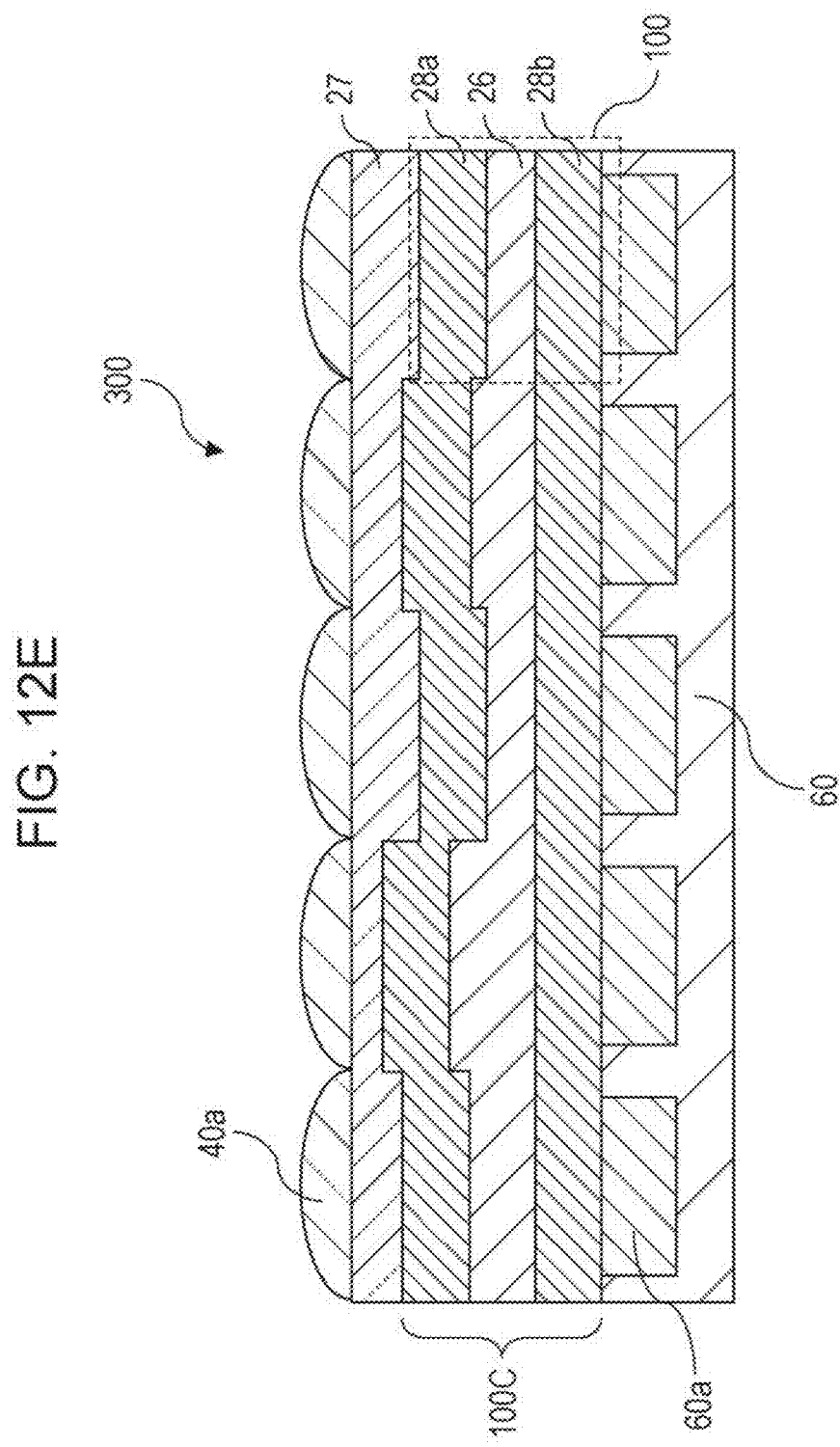

PHOTODETECTION DEVICE, PHOTODETECTION SYSTEM, AND FILTER ARRAY

BACKGROUND

1. Technical Field

The present disclosure relates to a photodetection device, a photodetection system, and a filter array.

2. Description of the Related Art

Utilization of spectral information on a large number of bands, e.g. several tens of bands, each of which is a narrow band makes it possible to understand in detail the physical properties of a physical object, although doing so has been impossible with a conventional RGB image. A camera that acquires such multiwavelength information is called "hyperspectral camera". For example, as disclosed in U.S. Patent Application Publication No. 2016/138975, U.S. Pat. Nos. 7,907,340, 9,929,206, Japanese Unexamined Patent Application Publication (Translation of PCT Application) No. 2013-512445, and Japanese Unexamined Patent Application Publication (Translation of PCT Application) No. 2015-501432, hyperspectral cameras have been utilized in various fields such as food inspection, biopsies, drug development, and componential analyses of minerals.

SUMMARY

In one general aspect, the techniques disclosed here feature a photodetection device including: a filter array including a plurality of filters arranged in a two-dimensional array, the plurality of filters including a first filter and a second filter, the first filter and the second filter each including a first reflective layer, a second reflective layer, and an intermediate layer between the first reflective layer and the second reflective layer and having a resonant structure having a plurality of resonant modes differing in order from each other, at least one selected from the group consisting of a refractive index and a thickness of the intermediate layer of the first filter being different from the at least one selected from the group consisting of a refractive index and a thickness of the intermediate layer of the second filter; and an image sensor disposed at a position where the image senor receives light having passed through the filter array. The first reflective layer includes a plurality of first dielectric layers each having a first refractive index and a plurality of second dielectric layers each having a second refractive index that is higher than the first refractive index. The plurality of first dielectric layers and the plurality of second dielectric layers are alternately disposed in the first reflective layer. At least two of the plurality of first dielectric layers have thicknesses differing from each other, and at least two of the plurality of second dielectric layers have thicknesses differing from each other. The second reflective layer includes a plurality of third dielectric layers each having a third refractive index and a plurality of fourth dielectric layers each having a fourth refractive index that is higher than the third refractive index. The plurality of third dielectric layers and the plurality of fourth dielectric layers are alternately disposed in the second reflective layer. At least two of the plurality of third dielectric layers have thicknesses differing from each other, and at least two of the plurality of fourth dielectric layers have thicknesses differing from each other.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram schematically showing a photodetection system according to an exemplary embodiment;

FIG. 6 is a diagram schematically showing examples of transmission spectra in each pixel;

FIG. 10B is a diagram schematically showing a second example of a Fabry-Perot filter including a dielectric multi-layer film in which the thicknesses of a plurality of pair layers are non-linearly modulated;

FIG. 12E is a diagram schematically showing a fifth modification of the photodetection device shown in FIG. 5.

DETAILED DESCRIPTION

Figure 2A:
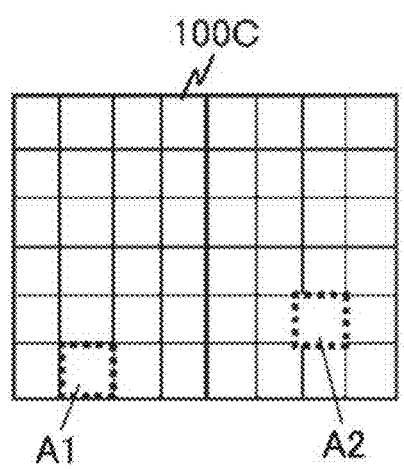
FIG. 2A is a diagram schematically showing an example of a filter array.

Prior to a description of an embodiment of the present disclosure, underlying knowledge forming the basis of the present disclosure is described.

U.S. Patent Application Publication No. 2016/138975 discloses an imaging device capable of acquiring a high-resolution multiwavelength image. In the imaging device, an image of light from a physical object is subjected to imaging by being encoded by an optical element referred to as "encoding element". The encoding element has a plurality of areas arrayed arranged in a two-dimensional array. The transmission spectrum of each of at least two of the plurality of areas has local maximum values of transmittance separately in each of a plurality of wavelength regions. The plurality of areas are disposed separately in correspondence with each of a plurality of pixels of, for example, an image sensor. In imaging that involves the use of the encoding element, each pixel is represented by data that contains information on a plurality of wavelength regions. That is, image data that is generated is data into which wavelength information is compressed. This makes it only necessary to retain two-dimensional data, and makes it possible to reduce data volume. For example, this makes it possible to acquire prolonged moving image data even in a case where the capacity of a storage medium is limited.

The encoding element may be manufactured using various methods. For example, a possible method involves the use of organic materials such as pigments or dyes. In this case, the plurality of areas of the encoding element are formed by light-absorptive materials having different light transmission characteristics. Such a structure causes the number of manufacturing steps to increase according to the number of types of light-absorptive material that are disposed. For this reason, it is not easy to fabricate the encoding element using organic materials.

Meanwhile, U.S. Pat. Nos. 7,907,340, 9,929,206, Japanese Unexamined Patent Application Publication (Translation of PCT Application) No. 2013-512445, and Japanese Unexamined Patent Application Publication (Translation of PCT Application) No. 2015-501432 disclose devices including a plurality of Fabry-Perot filters having transmission spectra differing from each other. A Fabry-Perot filter can be more easily fabricated than a filter formed from organic materials. However, in each of the examples disclosed in U.S. Pat. Nos. 7,907,340, 9,929,206, Japanese Unexamined Patent Application Publication (Translation of PCT Application) No, 2013-512445, and Japanese Unexamined Patent Application Publication (Translation of PCT Application) No. 2015-501432, each pixel is represented by data that contains only information on a single wavelength region. This sacrifices spatial resolution.

Based on the foregoing studies, the inventors conceived of a photodetection device, a photodetection system, and a filter array according to the following items.

First Item

A photodetection device according to a first item includes: a filter array including a plurality of filters arranged in a two-dimensional array, the plurality of filters including a first filter and a second filter, the first filter and the second filter each including a first reflective layer, a second reflective layer, and an intermediate layer sandwiched between the first reflective layer and the second reflective layer and having a resonant structure having a plurality of resonant modes differing in order from each other, at least one selected from the group consisting of a refractive index and a thickness of the intermediate layer of the first filter being different from the at least one selected from the group consisting of a refractive index and a thickness of the intermediate layer of the second filter; and an image sensor disposed at a position where the image senor receives light having passed through the filter array. The first reflective layer includes a plurality of first dielectric layers each having a first refractive index and a plurality of second dielectric layers each having a second refractive index that is higher than the first refractive index. The plurality of first dielectric layers and the plurality of second dielectric layers are alternately disposed in the first reflective layer. At least two of the plurality of first dielectric layers have thicknesses differing from each other, and at least two of the plurality of second dielectric layers have thicknesses differing from each other. The second reflective layer includes a plurality of third dielectric layers each having a third refractive index and a plurality of fourth dielectric layers each having a fourth refractive index that is higher than the third refractive index. The plurality of third dielectric layers and the plurality of fourth dielectric layers are alternately disposed in the second reflective layer. At least two of the plurality of third dielectric layers have thicknesses differing from each other, and at least two of the plurality of fourth dielectric layers have thicknesses differing from each other. In other words, a refractive index of the intermediate layer in the first filter is different from a refractive index of the intermediate layer in the second filter and/or a thickness of the intermediate layer in the first filter is different from a thickness of the intermediate layer in the second filter.

In this photodetection device, the filter array reduces at least either nonuniformity in line width or nonuniformity in peak intervals of a plurality of peaks included in each of a plurality of wavelength regions of transmission spectra. This makes it possible to improve uniformity across amounts of light in the respective wavelength regions that are detected by the image sensor. As a result, this makes it possible to improve the wavelength resolution of the photodetection device.

Second Item

In the photodetection device according to the first item, a transmission spectrum of each of the first and second filters may have a local maximum value of transmittance at each of a plurality of wavelengths included in a certain wavelength region, the plurality of wavelengths may correspond to the plurality of resonant modes, respectively, and the image sensor may have sensitivity to light in the wavelength region. In other words, each of the plurality of wavelengths may correspond to a corresponding one of the resonant modes.

This photodetection device makes it possible to acquire a multiwavelength image through a plurality of peaks included in a certain wavelength region of a transmission spectrum.

Third Item

In the photodetection device according to the first or second item, an optical length of each of the plurality of first dielectric layers may be equal to an optical length of one of the plurality of second dielectric layers adjacent to each of the plurality of first dielectric layers, and an optical length of each of the plurality of third dielectric layers may be equal to an optical length of one of the plurality of fourth dielectric layers adjacent to each of the plurality of third dielectric layers.

In this photodetection device, light of a wavelength corresponding to the optical length is reflected by the first reflective layer and the second reflective layer. This reduces at least either nonuniformity in line width or nonuniformity in peak interval of the plurality of peaks.

Fourth Item

In the photodetection device according to any one of the first to third items, in at least a part of the first reflective layer, a thickness of each of the plurality of first dielectric layers and a thickness of each of the plurality of second dielectric layers may gradually decrease or may gradually increase along a first direction away from the intermediate layer, and in at least a part of the second reflective layer, a thickness of each of the plurality of third dielectric layers and a thickness of each of the plurality of fourth dielectric layers may gradually decrease or may gradually increase along a second direction opposite to the first direction.

This photodetection device further reduces the nonuniformity in line width of the plurality of peaks in a case where there is a gradual decrease in thickness of the first and second dielectric layers, and further reduces the nonuniformity in peak interval in a case where there is a gradual increase in thickness of the first and second dielectric layers.

Fifth Item

In the photodetection device according to the fourth item, the plurality of first dielectric layers may include a first dielectric layer having a first film thickness and two first dielectric layers each having a second film thickness that is greater or smaller than the first film thickness, the two first dielectric layers may be continuously disposed so that one of the plurality of second dielectric layers is disposed between the two first dielectric layers, the plurality of third dielectric layers may include a third dielectric layer having a third film thickness and two third dielectric layers each having a fourth film thickness that is greater or smaller than the third film thickness, and the two third dielectric layers may be continuously disposed so that one of the plurality of fourth dielectric layers is disposed between the two third dielectric layers.

This photodetection device further reduces the nonuniformity in line width of the plurality of peaks in a case where the second film thickness is greater than the first film thickness and the fourth film thickness is greater than the third film thickness, and further reduces the nonuniformity in peak interval of the plurality of peaks in a case where the second film thickness is smaller than the first film thickness and the fourth film thickness is smaller than the third film thickness.

Sixth Item

In the photodetection device according to any one of the first to fifth items, the first refractive index may be equal to the third refractive index, and the second refractive index may be equal to the fourth refractive index.

This photodetection device brings about effects which are similar to those of the photodetection device according to any one of the first to fifth items.

Seventh Item

In the photodetection device according to any one of the first to sixth items, the intermediate layer may contain at least one selected from the group consisting of silicon, silicon nitride, titanium oxide, niobium oxide, and tantalum oxide.

This photodetection device brings about effects which are similar to those of the photodetection device according to any one of the first to sixth items.

Eighth Item

A photodetection system according to an eighth item includes: the photodetection device according to the second item; and a signal processing circuit. The signal processing circuit generates, in accordance with a signal from the image sensor, image data containing information on the plurality of wavelengths.

This photodetection system makes it possible to generate image data containing multiwavelength information.

Ninth Item

A filter array according to a ninth item includes a plurality of filters arranged in a two-dimensional array. The plurality of filters include a first filter and a second filter. The first filter and the second filter each include a first reflective layer, a second reflective layer, and an intermediate layer sandwiched between the first reflective layer and the second reflective layer and each have a resonant structure having a plurality of resonant modes differing in order from each other. At least one selected from the group consisting of a refractive index and a thickness of the intermediate layer of the first filter is different from the at least one selected from the group consisting of a refractive index and a thickness of the intermediate layer of the second filter. In other words, a refractive index of the intermediate layer in the first filter is different from a refractive index of the intermediate layer in the second filter and/or a thickness of the intermediate layer in the first filter is different from a thickness of the intermediate layer in the second filter. The filter array is used in the photodetection device according to any of the first to seventh items.

This filter array reduces at least either nonuniformity in line width or nonuniformity in peak intervals of a plurality of peaks included in each of a plurality of wavelength regions of transmission spectra.

In the present disclosure, all or some of the circuits, units, devices, members, or sections or all or some of the functional blocks in the block diagrams may be implemented as one or more of electronic circuits including, but not limited to, a semiconductor device, a semiconductor integrated circuit (IC), or an LSI (large scale integration). The LSI or IC can be integrated into one chip, or also can be a combination of multiple chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or some of the functions or operations of the circuits, units, devices, members, or sections are implemented by executing software. In such a case, the software is recorded on one or more non-transitory recording media such as a ROM, an optical disk, or a hard disk drive, and when the software is executed by a processor, the software causes the processor together with peripheral devices to execute the functions specified in the software. A system or device may include such one or more non-transitory recording media on which the software is recorded and a processor together with necessary hardware devices such as an interface.

The following describes a more specific embodiment of the present disclosure with reference to the drawings. Note, however, that an unnecessarily detailed description may be omitted. For example, a detailed description of a matter that is already well known and a repeated description of substantially identical configurations may be omitted. This is intended to avoid unnecessary redundancy of the following description and facilitate understanding of persons skilled in the art. It should be noted that the inventors provide the accompanying drawings and the following description for persons skilled in the art to fully understand the present disclosure and do not intend to thereby limit the subject matter recited in the claims. In the following description, identical or similar constituent elements are given the same reference signs.

Embodiment

Photodetection System

First, a photodetection system according to the present embodiment is described.

FIG. 1 is a diagram schematically showing a photodetection system 400 according to an exemplary embodiment. The photodetection system 400 includes an optical system 40, a filter array 100C, an image sensor 60, and a signal processing circuit 200. The filter array 100C has a function which is similar to that of the "encoding element" disclosed in U.S. Patent Application Publication No. 2016/138975. For this reason, the filter array 100C may also be referred to as "encoding element". The optical system 40 and the filter array 100C are disposed on the optical path of incident light from a physical object 70.

The filter array 100C includes a plurality of translucent areas arranged in rows and columns. The filter array 100C is an optical element in which the transmission spectrum of light, i.e. the wavelength dependence of light transmittance, varies from one area to another. The filter array 100C allows passage of the incident light by modulating the intensity of the incident light. The filter array 100C may be disposed near or directly above the image sensor 60. The term "near" here means that the filter array 100C is so close to the image sensor 60 that an image of light from the optical system 40 is formed on a surface of the filter array 100C with a certain degree of definition. The term "directly above" here means that the filter array 100C is so close to the image sensor 60 that almost no gap is formed between them. The filter array 100C and the image sensor 60 may be integrated. A device including the filter array 100C and the image sensor 60 is referred to as "photodetection device 300".

The optical system 40 includes at least one lens. Although FIG. 1 illustrates the optical system 40 as one lens, the optical system 40 may be constituted by a combination of a plurality of lenses. The optical system 40 forms an image on an imaging surface of the image sensor 60 via the filter array 100C.

On the basis of an image 120 acquired by the image sensor 60, the signal processing circuit 200 reconstructs a plurality of separate images 220 containing multiwavelength information. The plurality of separate images 220 and a method by which the signal processing circuit 200 processes an image signal will be described in detail later. The signal processing circuit 200 may be incorporated into the photodetection device 300, or may be a constituent element of a signal processing device electrically connected to the photodetection device 300 by wire or radio.

Filter Array

The following describes the filter array 100C according to the present embodiment. The filter array 100C is used in a spectroscopic system that generates images separately for each of a plurality of wavelength regions included in a wavelength region to be imaged. The wavelength region to be imaged is herein sometimes referred to as "target wavelength region". The filter array 100C is disposed on the optical path of incident light from the physical object 70, modulates the intensity of the incident light for each wavelength, and outputs the resulting light. This process, which is done by the filter array 100C, i.e. the encoding element, is herein referred to as "encoding".

FIG. 2A is a diagram schematically showing an example of the filter array 100C. The filter array 100C has a plurality of areas arranged in a two-dimensional array. These areas are herein sometimes referred to as "cells". In each of the areas, a filter having an individually set transmission spectrum is disposed. The transmission spectrum is expressed by a function $T(\lambda)$, where $\lambda$ is the wavelength of incident light. The transmission spectrum $T(\lambda)$ may assume a value greater than or equal to 0 and less than or equal to 1. A configuration of the filter will be described in detail later.

In the example shown in FIG. 2A, the filter array 100C has forty-eight rectangular areas arranged in six rows and eight columns. This is merely an example, and in an actual application, a larger number of areas may be provided. The number may be about equal to the number of pixels of a common photodetector such as an image sensor. The number of pixels range, for example, from hundreds of thousands to tens of millions. In an example, the filter array 100C may be disposed directly above the photodetector so that each of the areas corresponds to one pixel of the photodetector. Each of the areas faces, for example, one pixel of the photodetector.

Figure 2B:
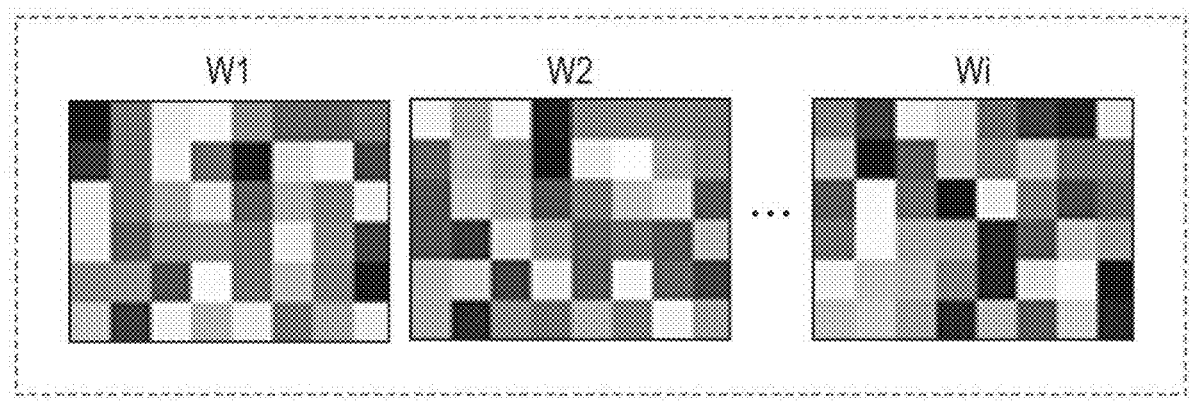
FIG. 2B is a diagram showing examples of spatial distributions of the transmittances of light separately in each of a plurality of wavelength regions included in a target wavelength region.

FIG. 2B is a diagram showing examples of spatial distributions of the transmittances of light separately in each of a plurality of wavelength regions W1, W2, . . . , and Wi included in a target wavelength region. In the example shown in FIG. 2B, light and dark irregularities seen in the areas represent differences in transmittance. A lighter area is higher in transmittance, and a darker area is lower in transmittance. As shown in FIG. 2B, the spatial distributions of light transmittances vary from wavelength region to wavelength region.

Figure 2C:
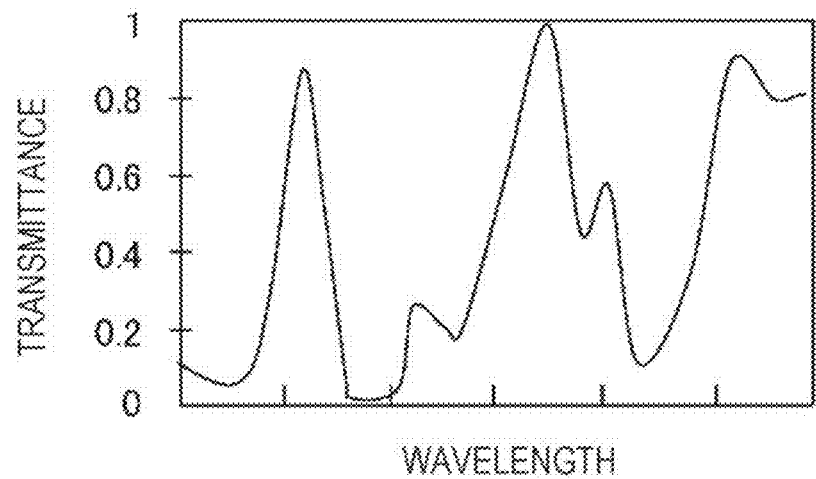
FIG. 2C is a diagram showing an example of the transmission spectrum of one of two areas included in a plurality of areas of the filter array shown in FIG. 2A.
Figure 2D:
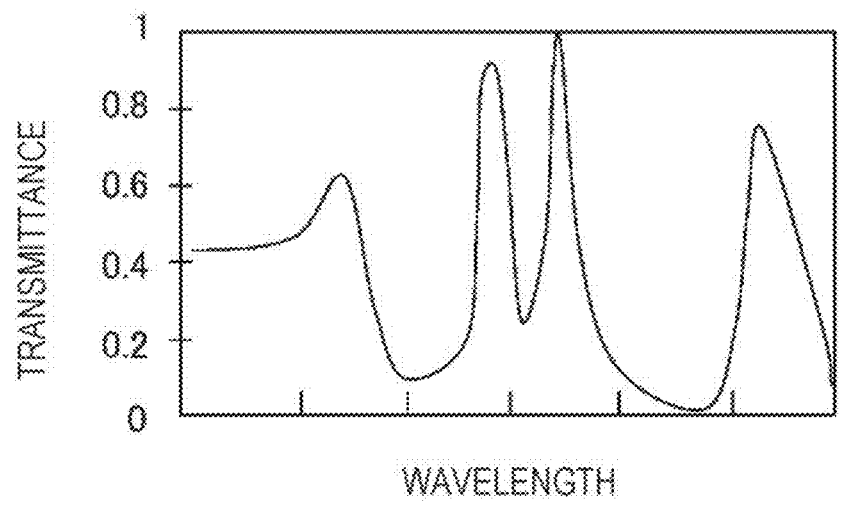
FIG. 2D is a diagram showing an example of the transmission spectrum of the other of the two areas included in the plurality of areas of the filter array shown in FIG. 2A.

FIGS. 2C and 2D are diagrams showing examples of the transmission spectra of areas A1 and A2, respectively, included in the plurality of areas of the filter array 100C shown in FIG. 2A. The transmission spectrum of the area A1 and the transmission spectrum of the area A2 are different from each other. In this way, the transmission spectrum of the filter array 100C varies from one area to another. Note, however, that not all areas need to have different transmission spectra. In the filter array 100C, at least some of the plurality of areas have transmission spectra differing from each other. The at least some of the plurality of areas are two or more areas. That is, the filter array 100C includes two or more filters having transmission spectra differing from each other. In an example, the number of patterns of the transmission spectra of the plurality of areas of the filter array 100C may be equal to or larger than the number i of wavelength regions included in the target wavelength region. The filter array 100C may be designed so that more than half of the areas have different transmission spectra.

Figure 3A:
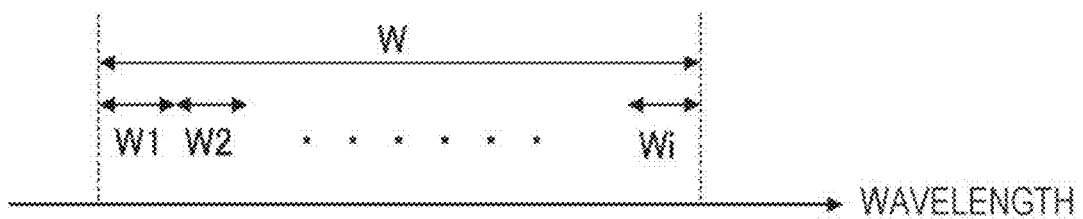
FIG. 3A is a diagram for explaining a relationship between a target wavelength region and a plurality of wavelength regions included in the target wavelength region.
Figure 3B:
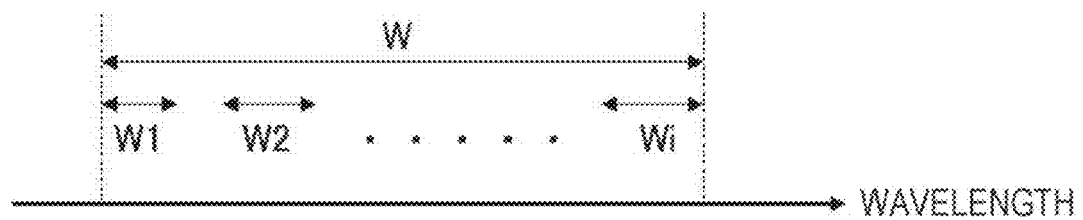
FIG. 3B is a diagram for explaining a relationship between a target wavelength region and a plurality of wavelength regions included in the target wavelength region.

FIGS. 3A and 3B are diagrams for explaining a relationship between a target wavelength region W and a plurality of wavelength regions W1, W2, . . . , and Wi included in the target wavelength region W. The target wavelength region W may be set to various ranges according to application. The target wavelength region W may for example be a wavelength region of visible light ranging from approximately 400 nm to approximately 700 nm, a wavelength region of near-infrared light ranging from approximately 700 nm to approximately 2500 nm, a wavelength region of near-ultraviolet light ranging from approximately 10 nm to approximately 400 nm, or a band of radio waves such as mid-infrared light, far-infrared light, terahertz waves, or millimeter waves. Thus, a wavelength region that is used is not limited to a visible light range. Invisible light such as near-ultraviolet light, near-infrared light, and radio waves, as well as visible light, is herein referred to as "light" for convenience.

In the example shown in FIG. 3A, i is an arbitrary integer greater than or equal to 4, and the target wavelength region W is divided into i equal wavelength regions W1, W2, . . . , and Wi. Note, however, that this example is not intended to impose any limitation. The plurality of wavelength regions included in the target wavelength region W may be arbitrarily set. For example, the wavelength regions may have non-uniform bandwidths. There may be a gap between adjacent wavelength regions. In the example shown in FIG. 3B, the wavelength regions have different bandwidths and there is a gap between two adjacent wavelength regions. Thus, the plurality of wavelength regions need only be different from one another, and how they are different can be determined arbitrarily. The number i of wavelength regions into which the target wavelength region W is divided may be smaller than or equal to 3.

Figure 4A:
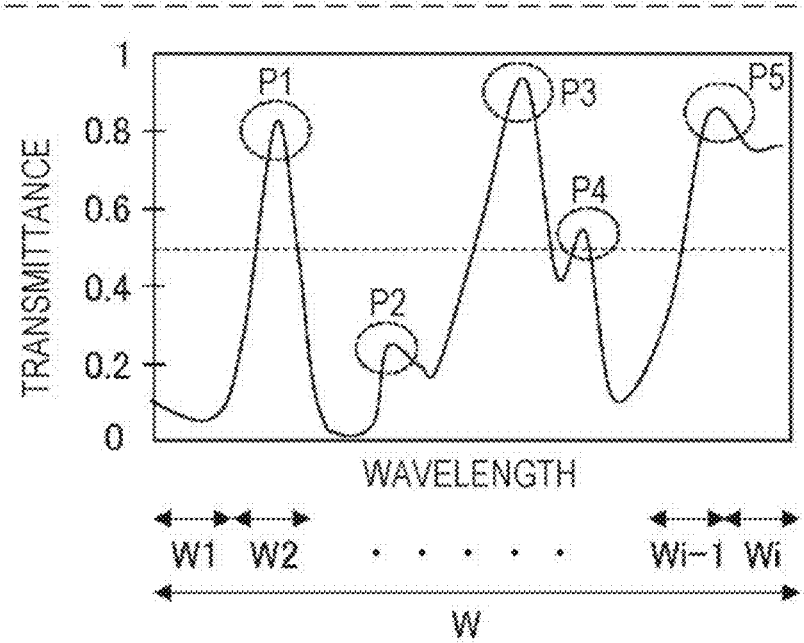
FIG. 4A is a diagram for explaining the characteristics of a transmission spectrum in a certain area of the filter array.

FIG. 4A is a diagram for explaining the characteristics of a transmission spectrum in a certain area of the filter array 100C. In the example shown in FIG. 4A, the transmission spectrum has a plurality of local maximum values P1 to P5 and a plurality of local minimum values at wavelengths within the target wavelength region W. The example shown in FIG. 4A is normalized so that the largest and smallest values of light transmittance within the target wavelength region W are 1 and 0, respectively. In the example shown in FIG. 4A, the transmittance spectrum has local maximum values in wavelength regions such as the wavelength region W2 and a wavelength region Wi−1. Thus, in the present embodiment, the transmission spectrum of each of the areas has local maximum values in at least two of the plurality of wavelength regions W1 to Wi. As can be seen from FIG. 4A, the local maximum values P1, P3, P4, and P5 are greater than or equal to 0.5.

As noted above, the light transmittance of each of the areas varies from one wavelength to another. Accordingly, the filter array 100C transmits much of a component of the incident light lying within a certain wavelength region and does not transmit as much of a component of the incident light lying within another wavelength region. For example, the transmittance of light in k out of the i wavelength regions may be higher than 0.5, and the transmittance of light in the remaining i-k wavelength regions may be lower than 0.5. k is an integer that satisfies 2≤k<i. If the incident light is white light containing all wavelength components of visible light evenly, the filter array 100C modulates the incident light for each area into light having a plurality of wavelength-discrete peaks of intensity, and outputs these multiwavelength lights superimposed on each other.

Figure 4B:
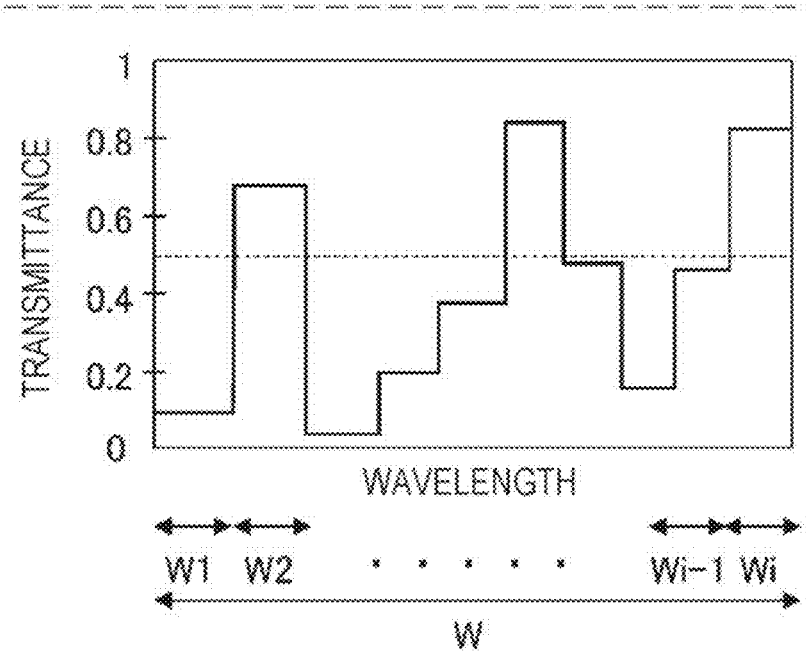
FIG. 4B is a diagram showing a result obtained by averaging, for each of the wavelength regions, the transmission spectrum shown in FIG. 4A.

FIG. 4B is a diagram showing a result obtained by averaging, for each of the wavelength regions W1, W2, . . . , and Wi, the transmission spectrum shown in FIG. 4A. The averaged transmittance can be obtained by integrating the transmission spectrum T(λ) for each wavelength region and dividing the transmission spectrum T(λ) by the bandwidth of that wavelength region. The value of transmittance thus averaged for each wavelength region is herein referred to as "transmittance in the wavelength region". In this example, prominently high transmittances are seen in three wavelength regions assuming the local maximum values P1, P3, and P5. In particular, transmittances exceeding 0.8 are seen in two wavelength regions assuming the local maximum values P3 and P5.

The resolving power of the transmission spectrum of each of the areas in a wavelength direction may be set substantially to the bandwidth of a desired wavelength region. In other words, in a wavelength range in a transmission spectral curve that includes one local maximum value, the width of a range assuming a value greater than or equal to the average of a local minimum value closest to the local maximum value and the local maximum value may be set substantially to the bandwidth of a desired wavelength region. In this case, resolving the transmission spectrum into frequency components, for example, through a Fourier transformation leads to a relative increase in value of a frequency component corresponding to that wavelength region.

Typically, as shown in FIG. 2A, the filter array 100C is divided into a plurality of cells segmented in grid-like fashion. These cells have transmission spectra differing from one another. A wavelength distribution of and a spatial distribution of light transmittance in each of the areas of the filter array 100C may for example be random distributions or pseudo-random distributions.

The following describes ways of thinking about a random distribution and a pseudo-random distribution. First, each of the areas of the filter array 100C can be thought of as a vector element having a value of, for example, 0 to 1 according to light transmittance. In a case where the transmittance is 0, the value of the vector element is 0, and in a case where the transmittance is 1, the value of the vector element is 1. In other words, a set of areas arranged in a line in a row-wise direction or a column-wise direction can be thought of as a multidimensional vector having a value of 0 to 1. Accordingly, the filter array 100C can be said to include a plurality of multidimensional vectors in a row-wise direction or a column-wise direction. The term "random distribution" here means that any two multidimensional vectors are independent of each other, i.e. not parallel to each other. Further, the term "pseudo-random distribution" means including a configuration in which some multidimensional vectors are not independent of each other. Accordingly, in a random distribution or a pseudo-random distribution, a vector whose element is a value of transmittance of light in a first wavelength region in each of areas belonging to a set of areas included in the plurality of areas and arranged in one row or column and a vector whose element is a value of transmittance of light in the first wavelength region in each of areas belonging to a set of areas included in the plurality of areas and arranged in another row or column are independent of each other. The same applies to a second wavelength region that is different from the first wavelength region. That is, a vector whose element is a value of transmittance of light in the second wavelength region in each of areas belonging to a set of areas included in the plurality of areas and arranged in one row or column and a vector whose element is a value of transmittance of light in the second wavelength region in each of areas belonging to a set of areas included in the plurality of areas and arranged in another row or column are independent of each other.

In a case where the filter array 100C is disposed near or directly above the image sensor 60, the plurality of areas of the filter array 100C may be placed at spacings, called cell pitches, that are substantially equal to pitches at which pixels of the image sensor 60 are placed. In this way, the resolution of an encoded image of light emitted from the filter array 100C is substantially equal to the resolution of the pixels. The after-mentioned operation can be facilitated by allowing light having passed through a cell to fall on only one pixel. In a case where the filter array 100C is placed at a distance from the image sensor 60, the cell pitches may be made finer according to the distance.

The examples shown in FIGS. 2A to 2D assume gray-scale transmittance distributions in which the transmittance of each of the areas may assume any value greater than or equal to 0 and less than or equal to 1. However, the gray-scale transmittance distributions are not always the case. For example, it is possible to employ binary-scale transmittance distributions in which the transmittance of each of the areas may assume a value of either substantially 0 or substantially 1. In the binary-scale transmittance distributions, each of the areas transmits a large portion of light in at least two of the plurality of wavelength regions included in the target wavelength region and does not transmit a large portion of light in the remaining wavelength regions. The term "large portion" here refers to substantially 80% or larger.

Some of all cells, e.g. half of the cells, may be replaced by transparent areas. Such a transparent area transmits, at about equally high transmittances, light in all of the wavelength regions W1 to Wi included in the target wavelength region. The high transmittances are for example higher than or equal to 0.8. In such a configuration, the plurality of transparent areas may be arranged, for example, in a checkered pattern. That is, in two array directions of the plurality of areas of the filter array 100C, the areas whose light transmittances vary according to wavelength and the transparent areas may be alternately arrayed. In the example shown in FIG. 2A, the two array directions are a transverse direction and a longitudinal direction.

Signal Processing Circuit

The following describes a method by which the signal processing circuit 200 shown in FIG. 1 reconstructs the multiwavelength separate images 220 on the basis of the image 120 and the spatial distribution characteristics of transmittance of the filter array 100C for each wavelength. The term "multiwavelength" here means a larger number of wavelength regions than the number of wavelength regions of three colors of RGB acquired, for example, by an ordinary color camera. This number of wavelength regions may be a number ranging, for example, approximately from 4 to 100. This number of wavelength regions is sometimes referred to as "number of spectral bands". In some applications, the number of spectral bands may exceed 100.

Desired data is the separate images 220, and the data is denoted by f. When the number of spectral bands is denoted by w, f is data obtained by integrating image data $f_1$, $f_2$, ..., and $f_w$ of each separate band. When the number of pixels in an x direction of the image data to be obtained is denoted by n and the number of pixels in a y direction is denoted by m, each of the image data $f_1$, $f_2$, ..., and $f_w$ is a set of two-dimensional data representing n×m pixels. Accordingly, the data f is three-dimensional data representing the number of elements n×m×w. Meanwhile, the number of elements of data g representing the image 120 acquired though encoding and multiplexing by the filter array 100C is n×m. In the present embodiment, the data g can be expressed by Formula (1) as follows:

$$g = Hf = H \begin{bmatrix} f_1 \\ f_2 \\ \vdots \\ f_w \end{bmatrix} \quad (1)$$

In this formula, $f_1$, $f_2$, ..., and $f_w$ are data having n×m elements. Accordingly, the right-hand vector is technically a one-dimensional vector with an n×m×w rows and one column. The vector g is expressed and calculated in terms of a one-dimensional vector with an n×m rows and one column. The matrix H represents a transformation by which the components $f_1$, $f_2$, ..., and $f_w$ of the vector f are subjected to encoding and intensity modulation with different pieces of encoding information for each wavelength region and added together. Accordingly, H is a matrix with n×m rows and n×m×w columns.

It now seems that once the vector g and the matrix H are given, f can be computed by solving an inverse problem of Formula (1). However, since the number of elements n×m×w of the data f to be obtained is larger than the number of elements n×m of the acquired data g, this problem is an ill-posed problem that cannot be directly solved. To address this problem, the signal processing circuit 200 of the present embodiment obtains the solution using a technique of compressed sensing through the use of redundancy of images contained in the data f. Specifically, the data f to be obtained is estimated by solving Formula (2) as follows:

$$f' = \underset{f}{\operatorname{argmin}} \{ \|g - Hf\|_{l_2} + \tau \Phi(f) \} \quad (2)$$

In this formula, f' represents the data f thus estimated. The first term in parentheses of the above formula represents a difference between an estimated result Hf and the acquired data g, i.e. a so-called residual. Although the residual is a sum of squares here, the residual may for example be an absolute value or a square root of sum of squares. The second term in parentheses is the after-mentioned regularization term or stabilization term. Formula (2) means obtaining f that minimizes the sum of the first term and the second term. The signal processing circuit 200 can compute the final solution f' through convergence of solutions by a recursive iterative operation.

The first term in parentheses of Formula (2) means an operation of finding the sum of squares of the difference between the acquired data g and Hf obtained by a system transformation by the matrix H of f being estimated. Φ(f) of the second term is a constraint on the regularization of f, and is a function reflecting sparse information of the estimated data. Φ(f) functions to bring about an effect of smoothing or stabilizing the estimated data. The regularization term may be expressed, for example, by a discrete cosine transformation (DCT), a wavelet transformation, a Fourier transformation, or a total variation (TV) of f. For example, in a case where a total variation is used, stable estimated data can be acquired with a reduction in the effect of noise of the observed data g. The sparsity of the physical object 70 in a space of each regularization term varies depending on the texture of the physical object 70. It is possible to choose a regularization term having a space in which the texture of the physical object 70 becomes sparser. Alternatively, it is possible to incorporate a plurality of regularization terms into the operation. τ is a weighting factor. A greater weighting factor τ leads to an increase in reduction of redundant data, and by extension to a higher rate of compression. A smaller weighting factor τ leads to a weaker convergence to the solution. The weighting factor τ is set to such an appropriate value that f converges to some extent and does not become overcompressed.

Although, in this example operation, the compressed sensing shown in Formula (2) is used, another method may be used to obtain the solution. For example, another statistical method such as maximum likelihood estimation or a Bayesian estimation method may be used. Further, the number of separate images 220 is arbitrary, and each of the wavelength regions may be arbitrarily set. Details of the reconstruction method are disclosed in U.S. Patent Application Publication No. 2016/138975. The entire contents of the disclosure in U.S. Patent Application Publication No. 2016/138975 are hereby incorporated by reference.

Filter Array Including Fabry-Perot Filters

The following describes a more specific example of a structure of the filter array 100C.

Figure 5:
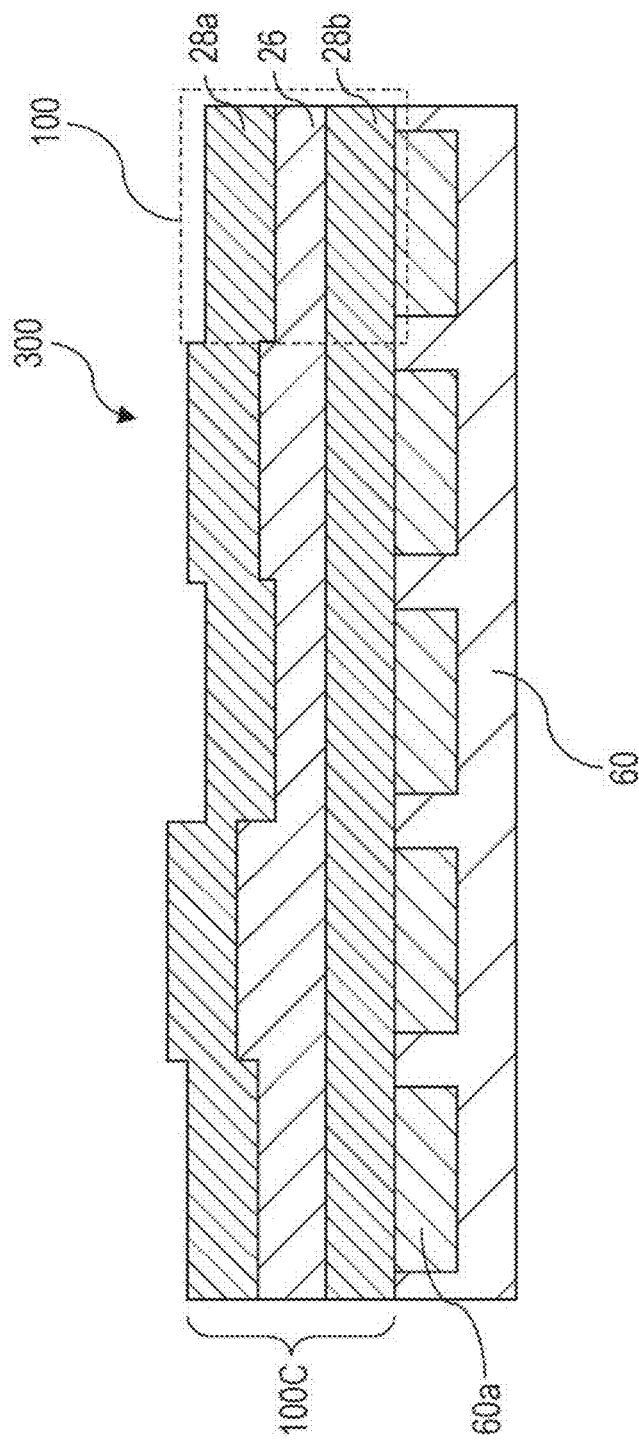
FIG. 5 is a cross-sectional view schematically showing a photodetection device according to the exemplary embodiment.

FIG. 5 is a cross-sectional view schematically showing the photodetection device 300 according to the exemplary embodiment. The photodetection device 300 includes the filter array 100C and the image sensor 60.

The filter array 100C includes a plurality of filters 100 arranged in a two-dimensional array. For example, as shown in FIG. 2A, the plurality of filters 100 are arranged in rows and columns. FIG. 5 schematically shows a cross-section structure of one row shown in FIG. 2A. Each of the plurality of filters 100 includes a resonant structure. The term "resonant structure" means a structure in which light of a certain wavelength stably exists with a standing wave formed inside. This state of light is sometimes referred to as "resonant mode". The resonant structure shown in FIG. 5 includes a first reflective layer 28a, a second reflective layer 28b, and an intermediate layer 26 sandwiched between the first reflective layer 28a and the second reflective layer 28b. The first reflective layer 28a and/or the second reflective layer 28b may be formed from a dielectric multi-layer film or a metal thin film. The intermediate layer 26 may be formed from a dielectric or a semiconductor that is transparent in a particular wavelength region. The intermediate layer 26 may be formed, for example, from at least one selected from the group consisting of silicon, silicon nitride, titanium oxide, niobium oxide, and tantalum oxide. The refractive indices and/or thicknesses of the intermediate layers 26 of the plurality of filters 100 vary from filter to filter. The transmission spectrum of each of the plurality of filters 100 has local maximum values of transmittance at a plurality of wavelengths. The plurality of wavelengths correspond to a plurality of resonant modes with different orders in the aforementioned resonant structure. In the present embodiment, all of the filters 100 of the filter array 100C include such resonant structures. The filter array 100C may include a filter that does not have such a resonant structure. For example, the filter array 100C may include a filter, such as a transparent filter or an ND (neutral density filter), that does not have wavelength dependence of light transmittance. In the present disclosure, each of two or more of the plurality of filters 100 includes the aforementioned resonant structure.

The image sensor 60 includes a plurality of photodetection elements 60a, Each of the plurality of photodetection elements 60a is disposed to face one of the plurality of filters 100. Each of the plurality of photodetection elements 60a has sensitivity to light in a particular wavelength region. The particular wavelength region corresponds to the aforementioned target wavelength region W. The phrase "having sensitivity to light in a certain wavelength region" herein refers to having substantive sensitivity needed to detected light in the wavelength region. For example, the phrase refers to having an external quantum efficiency of 1% or higher in the wavelength region. The external quantum efficiency of a photodetection element 60a may be higher than or equal to 10%. The external quantum efficiency of a photodetection element 60a may be higher than or equal to 20%. All of the plurality of wavelengths at which the light transmittance of each of the filters 100 assumes local maximum values are included in the target wavelength region W. A photodetection element 60a is hereinafter sometimes referred to as "pixel".

Without being limited to the example shown in FIG. 5, the filter array 100C and the image sensor 60 may be separate from each other. Even in that case, each of the plurality of photodetection elements 60a is disposed in such a place as to receive light having passed through one of the plurality of filters 100. Each constituent element may be disposed so that light having passed through the plurality of filters 100 falls separately on each of the plurality of photodetection elements 60a via a mirror. In that case, each of the photodetection elements 60a is not disposed directly below one of the plurality of filters 100.

A filter 100 including the aforementioned resonant structure is herein sometimes referred to as "Fabry-Perot filter". A portion of a transmission spectrum that has a local maximum value is herein sometimes referred to as "peak", and a wavelength at which a transmission spectrum has a local maximum value is herein sometimes referred to as "peak wavelength".

The following describes the transmission spectrum of a filter 100 that is a Fabry-Perot filter.

Let it be assumed in a filter 100 that L is the thickness of the intermediate layer 26, n is the refractive index of the intermediate layer 26, $\theta_i$ is the angle of incidence of light arriving at the filter 100, and m is the mode number of a resonant mode. m is an integer greater than or equal to 1. In this case, the peak wavelength $\lambda_m$ of the transmission spectrum of the filter 100 is expressed by Formula (3) as follows:

$$\lambda_m = \frac{2nL}{m} \sqrt{1 - \left(\frac{\sin\theta_i}{n}\right)^2} \quad (3)$$

Let it be assumed that $\lambda_l$ and $\lambda_e$ are the shortest and longest wavelengths, respectively, in the target wavelength region W. A filter 100 in which there is one m that satisfies $\lambda_l \le \lambda_m \le \lambda_e$ is herein referred to as "single-mode filter". A filter 100 in which there are two or more m's that satisfy $\lambda_l \le \lambda_m \le \lambda_e$ is herein referred to as "multimode filter". The following describes an example of a case where the shortest and longest wavelengths $\lambda_l$ and $\lambda_e$ in the target wavelength region W are equal to 400 nm and 700 nm, respectively.

For example, in the case of a filter 100 in which the thickness L is equal to 300 nm, the refractive index n is equal to 1.0, and the vertical incidence $\theta_i$ is equal to 0 degree, the peak wavelength $\lambda_1$ at the time that m=1 is equal to 600 nm, and the peak wavelength $\lambda_{m\ge 2}$ at the time that m≥2 is shorter than or equal to 300 nm. Accordingly, this filter 100 is a single-mode filter having one peak wavelength in the target wavelength region W.

Meanwhile, when the thickness L is greater than 300 nm, a plurality of peak wavelengths are included in the target wavelength region W. For example, in the case of a filter 100 in which the thickness L is equal to 3000 nm, the refractive index n is equal to 1.0, and the vertical incidence $\theta_i$ is equal to 0 degree, the peak wavelength $\lambda_{1\le m\le 8}$ at the time that 1≤m≤8 is longer than or equal to 750 nm, the peak wavelength $\lambda_{9\le m\le 15}$ at the time that 9≤m≤15 is longer than or equal to 400 nm and shorter than or equal to 700 nm, and the peak wavelength $\lambda_{m\le 16}$ at the time that m≥16 is shorter than or equal to 375 nm. Accordingly, this filter 100 is a multimode filter having seven peak wavelengths included in the target wavelength region W.

As noted above, a multimode filter can be achieved by appropriately designing the thickness of the intermediate layer 26 of a filter 100. Instead of the thickness of the intermediate layer 26, the refractive index of the intermediate layer 26 of the filter 100 may be appropriately designed. Alternatively, both the thickness and refractive index of the intermediate layer 26 of the filter 100 may be appropriately designed.

FIG. 6 is a diagram schematically showing examples of transmission spectra in each pixel in a case where a plurality of multimode filters having transmission spectra differing from one another are disposed above a plurality of pixels serving as the plurality of photodetection elements 60a, respectively. FIG. 6 illustrates transmission spectra in pixels A, B, and C. The plurality of multimode filters are designed so that peak wavelengths vary slightly from pixel to pixel. Such a design can be achieved by slightly varying the thickness L and/or the refractive index n in Formula (3). In this case, in each of the pixels, a plurality of peaks appear in the target wavelength region W. The respective mode numbers of the plurality of peaks are the same in each of the pixels 60a. The mode numbers of the plurality of peaks shown in FIG. 6 are m, m+1, and m+2. The photodetection device 300 according to the present embodiment can simultaneously detect light at a plurality of peak wavelengths varying from pixel to pixel.

The following describes an example in which the first reflective layer 28a and the second reflective layer 28b are each formed from a dielectric multi-layer film.

Figure 7A:
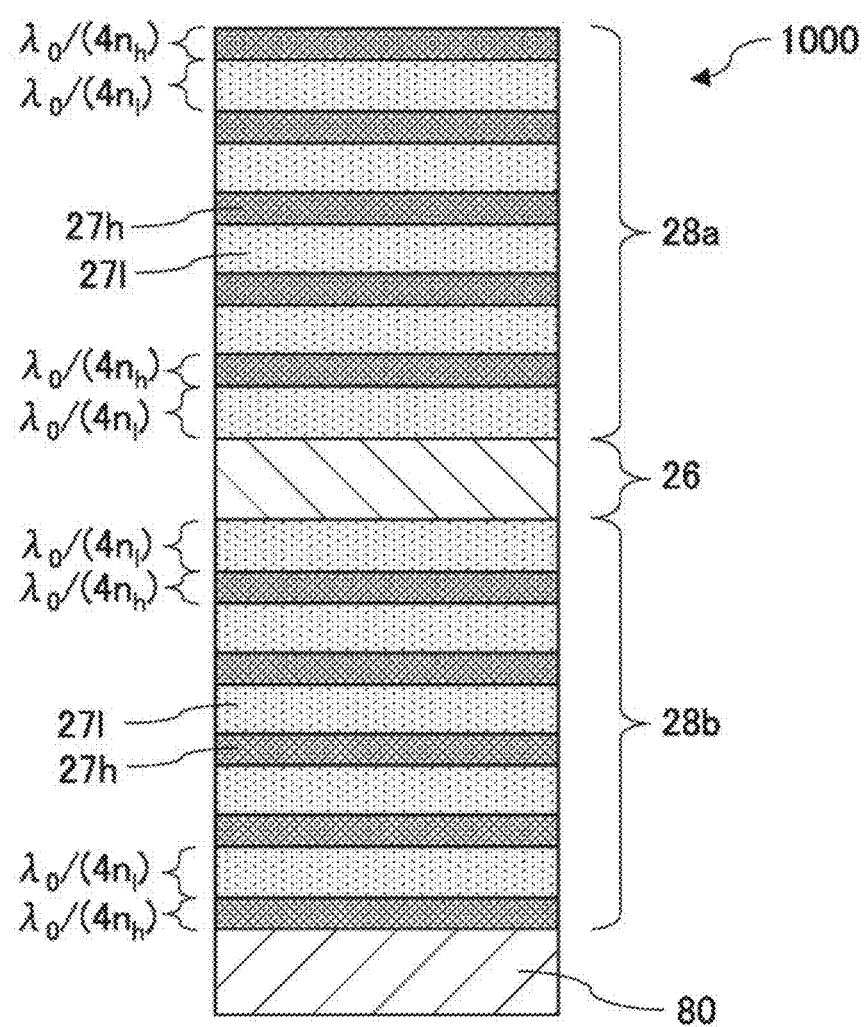
FIG. 7A is a diagram schematically showing an example of a Fabry-Perot filter including a common dielectric mufti-layer film.

FIG. 7A is a diagram schematically showing an example of a filter 1000 that is a Fabry-Perot filter including a common dielectric multi-layer film. The filter 1000 is provided on a substrate 80. The first reflective layer 28a and the second reflective layer 28b are each formed from a dielectric multi-layer film. That is, the first reflective layer 28a and the second reflective layer 28b each include a structure in which a plurality of low-refractive-index layers 27l that are dielectric layers having a low refractive index and a plurality of high-refractive-index layers 27h that are dielectric layers having a high refractive index alternate. Each of the plurality of low-refractive-index layer 27l has a refractive index $n_l$, and each of the plurality of high-refractive-index layers 27h has a refractive index $n_h$ that is higher than the refractive index $n_l$. The low-refractive-index layers 27l in the first reflective layer 28a and the low-refractive-index layers 27l in the second reflective layer 28b may have the same refractive index or may have different refractive indices. The high-refractive-index layers 27h in the first reflective layer 28a and the high-refractive-index layers 27h in the second reflective layer 28b may have the same refractive index or may have different refractive indices. The low-refractive-index layers 27l in the first reflective layer 28a, the high-refractive-index layers 27h in the first reflective layer 28a, the low-refractive-index layers 27l in the second reflective layer 28b, and the high-refractive-index layers 27h in the second reflective layer 28b are herein sometimes referred to as "first dielectric layers", "second dielectric layers", "third dielectric layers", and "fourth dielectric layers", respectively. The refractive index of each of the low-refractive-index layers 27l in the first reflective layer 28a, the refractive index of each of the high-refractive-index layers 27h in the first reflective layer 28a, the refractive index of each of the low-refractive-index layers 27l in the second reflective layer 28b, and the refractive index of each of the high-refractive-index layers 27h in the second reflective layer 28b are herein sometimes referred to as "first refractive index", "second refractive index", "third refractive index", and "fourth refractive index", respectively.

A dielectric multi-layer film includes a plurality of pair layers. One pair layer includes one low-refractive-index layer 27l and one high-refractive-index layer 27h. In the example shown in FIG. 7A, the first reflective layer 28a and the second reflective layer 28b each include five pair layers including ten refractive index layers. In the example shown in FIG. 7A, a high reflectance is attained at a particular wavelength $\lambda_0$ within the target wavelength region W by setting the thicknesses of the high-refractive-index layers 27h to $t_h = \lambda_0/(4n_h)$ and setting the thicknesses of the low-refractive-index layers 27l to $t_l = \lambda_0/(4n_l)$. In other words, the optical lengths of the thicknesses $t_h$ of the high-refractive-index layers 27h and the optical lengths of the thicknesses $t_l$ of the low-refractive-index layers 27l are $\lambda_0/4$. The term "optical length" here means a value obtained by multiplying a thickness by a refractive index. The particular wavelength $\lambda_0$ may be set, for example, to a center wavelength $(\lambda_l + \lambda_e)/2$ in the target wavelength region W.

Figure 7B:
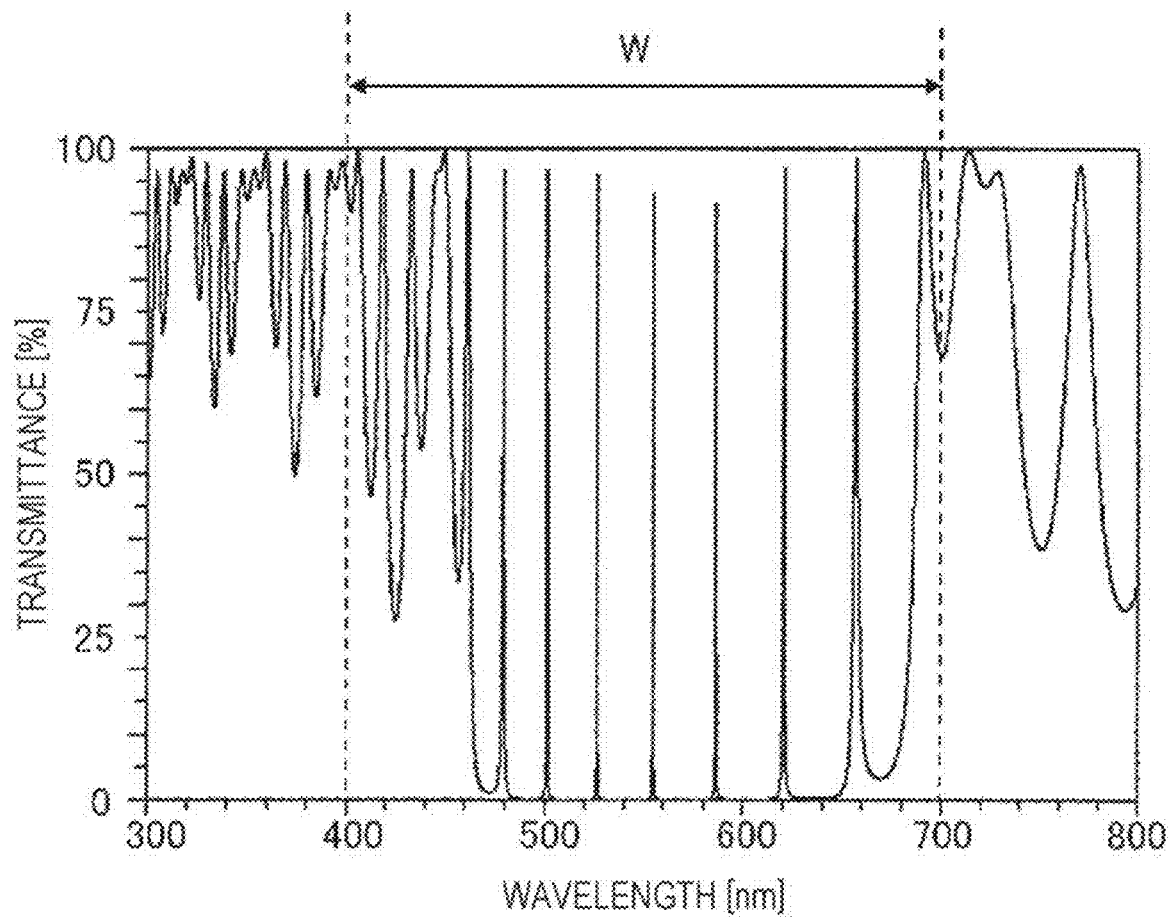
FIG. 7B is a diagram showing the transmission spectrum of the Fabry-Perot filter shown in FIG. 7A.

FIG. 7B is a diagram showing the transmission spectrum of the filter 1000 shown in FIG. 7A. In this example, the low-refractive-index layers 27l are formed from silicon dioxide, and the high-refractive-index layers 27h are formed from titanium dioxide. The intermediate layer 26 are formed from titanium dioxide. The transmission spectrum was calculated using a Rsoft's Diffract MOD based on the rigorous coupled-wave analysis (RCWA). As shown in FIG. 7B, a plurality of peaks appear in the target wavelength region W. For the sake of ease, no consideration is given to high transmittance portions of the target wavelength region W ranging from 400 nm to 460 nm and ranging from 680 nm to 700 nm. The plurality of peaks are not uniform in line width and peak interval with one another. In the example shown in FIG. 7B, the line width of a peak nearer to the center of the target wavelength region W is narrower, and the line width of a peak farther away from the center of the target wavelength region W is wider. Further, a peak interval closer to the short-wavelength side is narrower, and a peak interval closer to the long-wavelength side is wider. The line width of a peak is associated with the time during which light having entered the filter 1000 is confined in the intermediate layer 26. The light having entered the filter 1000 is emitted toward the substrate 80 after having been confined in the intermediate layer 26 for a certain period of time by being reflected by the first reflective layer 28a and the second reflective layer 28b. The narrower the line width of a peak is, the longer the time during which the incident light is confined in the filter 1000 is. On the other hand, the wider the line width of a peak is, the shorter the time during which the incident light is confined in the filter 1000 is. A common dielectric multi-layer film is highest in reflectance at the center wavelength $\lambda_O$ in the target wavelength region W, and becomes lower in reflectance away from the center of the target wavelength region W. In other words, an ordinary dielectric multi-layer film is not uniform in reflectance in the target wavelength region W. For this reason, the time during which the incident light is confined in the filter 1000 varies from one wavelength to another. As a result, the plurality of peaks in the target wavelength region W are not uniform in line width with one another. An interval between peaks is determined from the relationship of Formula (3). In general, a peak interval in a Fabry-Perot filter, i.e. $\lambda_m - \lambda_{m+1}$, is proportional to the reciprocal of the optical length of an intermediate layer and the square of a wavelength. In the example shown in FIG. 7B, since light in the target wavelength region W is confined in the intermediate layer 26 by being reflected by the first reflective layer 28a and the second reflective layer 28b, the optical length of the intermediate layer is uniquely determined by a multiplication of the refractive index and film thickness of the intermediate layer 26, and the peak interval is proportional to the square of a wavelength. As a result, a peak interval closer to the short-wavelength side is narrower, and a peak interval closer to the long-wavelength side is wider, so that the plurality of peaks in the target wavelength region W are not uniform in interval with one another.

When the plurality of peaks in the target wavelength region W are not uniform in line width and peak interval with one another, the following problem may arise. The amount of light at a peak detected by a pixel is equivalent to a value obtained by integrating the transmittance within the range of line width of the peak. When the line width of a peak is narrow or a peak interval is wide, there is a decrease in amount of light. For this reason, depending on the sensitivity of a pixel, wavelength information may be lost during the operational process of reconstructing the separate images 220. As a result, the spatial resolution of the separate images 220 may decrease. On the other hand, when the line width of a peak is narrow or a peak interval is narrow, there is an increase in amount of light. As a result, the wavelength resolution of the separate images 220 may decrease, although an effective amount of light is obtained.

The inventors found the foregoing problems and conceived of a structure of a novel Fabry-Perot filter. The following describes an example of a Fabry-Perot filter that reduces nonuniformity in line width of the plurality of peaks in the target wavelength region W and peak intervals.

Figure 8A:
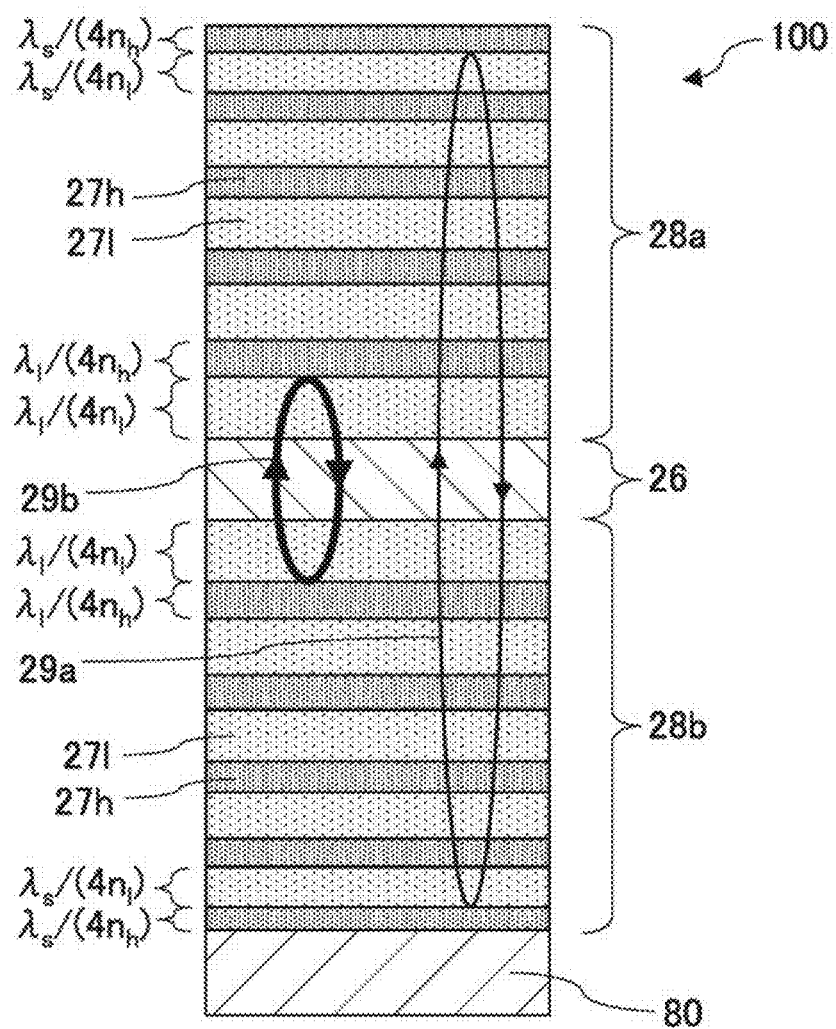
FIG. 8A is a diagram schematically showing an example of a Fabry-Perot filter including a dielectric mufti-layer film in which the thicknesses of a plurality of pair layers over a substrate are linearly modulated.

FIG. 8A is a diagram schematically showing an example of a filter 100 that is a Fabry-Perot filter including a dielectric multi-layer film in which the thicknesses of a plurality of pair layers are linearly modulated. A dielectric mufti-layer film in which there is a gradual increase or decrease in thickness of a plurality of pair layers is also referred to as "chirped mirror". In the example shown in FIG. 8A, unlike in the example shown in FIG. 7, the thicknesses of the plurality of high-refractive-index layers 27h and the thicknesses of the plurality of low-refractive-index layers 27l are not uniform in each of the first and second reflective layers 28a and 28b. That is, in each of the first and second reflective layers 28a and 28b, at least two of the low-refractive-index layers 27l have thicknesses differing from each other, and at least two of the high-refractive-index layers 27h have thicknesses differing from each other. In each of the first and second reflective layers 28a and 28b, the optical length of each of the plurality of low-refractive-index layers 27l is equal to the optical length of a high-refractive-index layer 27h adjacent to that low-refractive-index layer 27l. The dielectric multi-layer film shown in FIG. 8A may be designed to reflect light in a wavelength region ranging from a wavelength $\lambda_s$ to a wavelength $\lambda_l$. The wavelength $\lambda_l$ is longer than the wavelength $\lambda_s$. When, in each of the first and second reflective layers 28a and 28b, the plurality of pair layers are numbered, for example, from n=0 to n=3 in order of decreasing distance from the intermediate layer 26, the thicknesses of the high-refractive-index layers 27h are given as $t_h(n)=[\lambda_s+n(\lambda_l-\lambda_s)/3]/(4n_h)$, and the thicknesses of the low-refractive-index layers 27l are given as $t_l(n)=[\lambda_s+n(\lambda_l-\lambda_s)/3]/(4n_l)$. Thus, in each of the first and second reflective layers 28a and 28b, the thicknesses $t_h(n)$ of the high-refractive-index layers 27h and the thicknesses $t_l(n)$ of the low-refractive-index layers 27l are both linearly modulated from $\lambda_s/4$ to $\lambda_l/4$. The following assumes that the wavelength $\lambda_s$ is equal to 350 nm and the wavelength $\lambda_l$ is equal to 700 nm. In this case, the optical lengths of the thicknesses of each of the pair layers linearly vary from $\lambda_s/4=87.5$ nm to $\lambda_l/4=175$ nm. The wavelength $\lambda_s$ may be equal to $\lambda_i$, and the wavelength $\lambda_l$ may be equal to $\lambda_e$.

In the example shown in FIG. 8A, a first loop 29a indicated by a thin line and a second loop 29b indicated by a thick line represent light of the wavelength $\lambda_s$ and light of the wavelength $\lambda_l$ that are confined in the filter 100, respectively. The light of the wavelength $\lambda_s$ is reflected by a pair layer in the first reflective layer 28a that faces the plane of incidence and a pair layer in the second reflective layer 28b that faces the substrate 80. The light of the wavelength $\lambda_l$ is reflected by a pair layer in the first reflective layer 28a that faces the intermediate layer 26 and a pair layer in the second reflective layer 28b that faces the intermediate layer 26. In this way, the incident light is reflected by pair layers that correspond to the wavelength of the incident light. This reduces nonuniformity in reflectance in the target wavelength region W in the dielectric mufti-layer film.

Figure 8B:
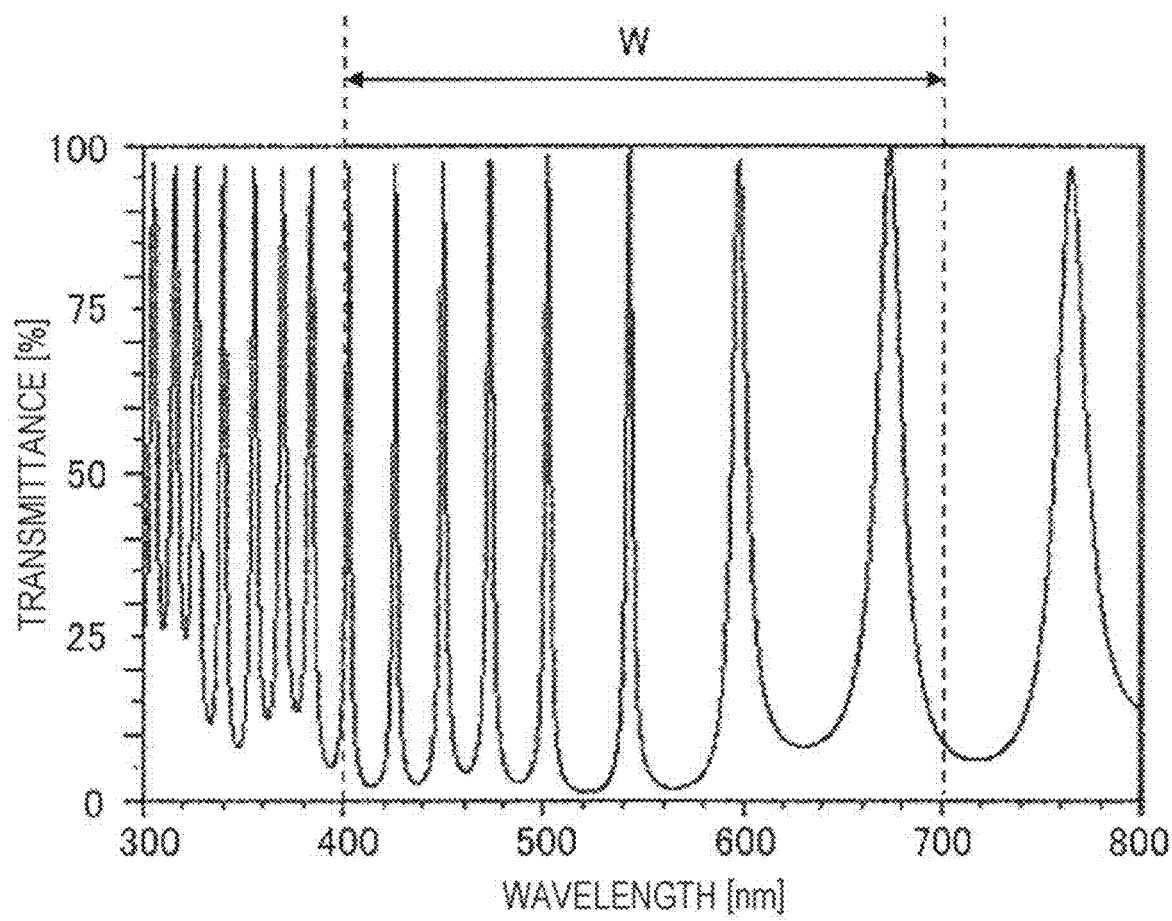
FIG. 8B is a diagram showing the transmission spectrum of the Fabry-Perot filter shown in FIG. 8A.

FIG. 8B is a diagram showing the transmission spectrum of the filter 100 shown in FIG. 8A. In the example shown in FIG. 8B, unlike in the example shown in FIG. 7B, a plurality of peaks are obtained throughout the target wavelength region W. Furthermore, the line width of a peak near the center of the target wavelength region W is as wide as the line width of a peak close to the shortest wavelength $\lambda_i$. In this way, the uniformity in line width of the plurality of peaks in the target wavelength region W is improved. Meanwhile, the line width of a peak close to the longest wavelength $\lambda_e$ is wider than the line width of a peak near the center of the target wavelength region W and the line width of a peak close to the shortest wavelength $\lambda_i$. A possible reason for this is as follows. An intensity distribution of light confined in the filter 100 decreases along a direction away from the intermediate layer 26 in the first reflective layer 28a and the second reflective layer 28b. When the wavelength of light confined in the filter 100 is short, an intensity distribution of the light tends to sharply decrease, and when the wavelength is long, the intensity distribution of the light tends to gently decrease. This makes the confinement of the light insufficient, thus shortening the time during which long-wavelength light is confined in the filter 100. As a result, the line width of a peak close to the longest wavelength $\lambda_e$ tends to become wider.

Accordingly, the following describes an example of a Fabry-Perot filter in which long-wavelength light can be confined for a longer time.

Figure 9A:
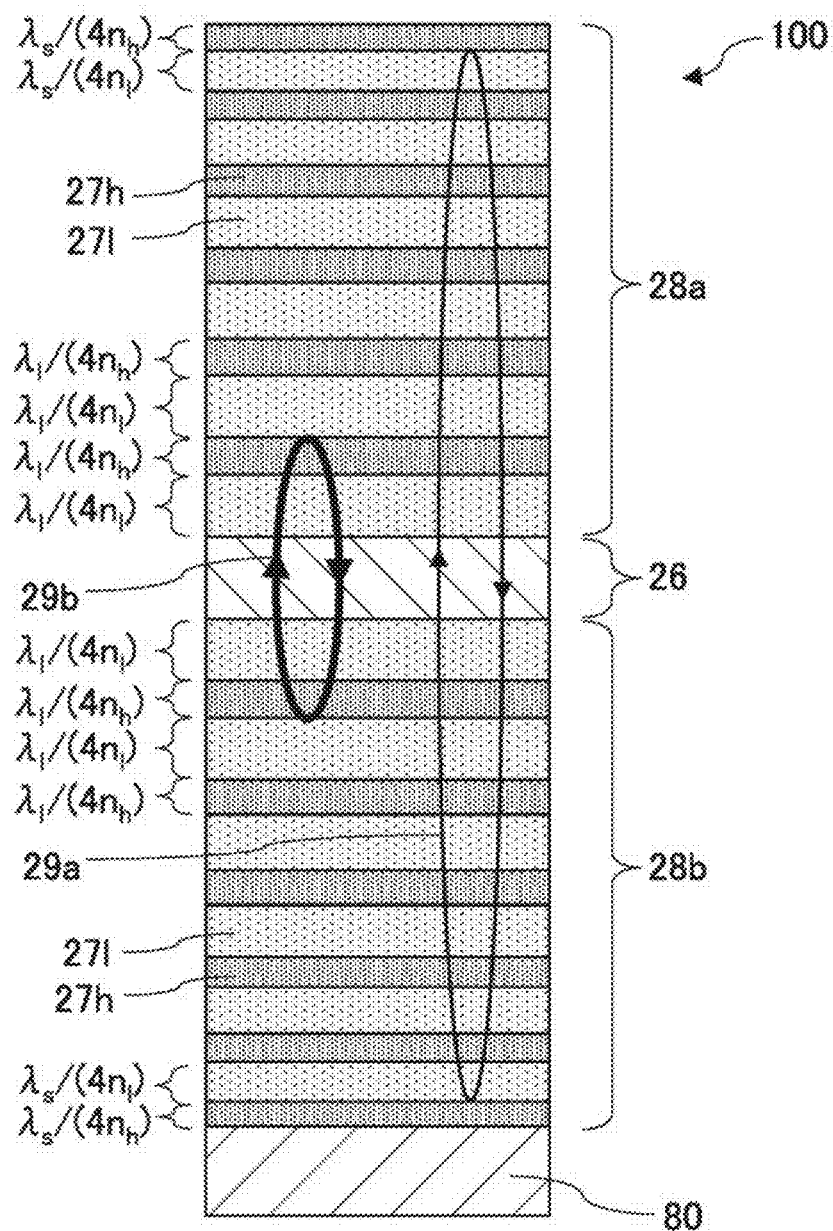
FIG. 9A is a diagram schematically showing an example of a Fabry-Perot filter including a dielectric multi-layer film in which the thicknesses of a plurality of pair layers are non-linearly modulated.

FIG. 9A is a diagram schematically showing an example of a filter 100 that is a Fabry-Perot filter including a dielectric multi-layer film in which the thicknesses of a plurality of pair layers are non-linearly modulated. In comparison with the example shown in FIG. 8A, pair layers each having thicknesses whose optical lengths are $\lambda_l/4$ are newly added on both sides of the intermediate layer 26. The first reflective layer 28a and the second reflective layer 28b each include six pair layers including twelve refractive index layers. In each of the first and second reflective layers 28a and 28b, the plurality of pair layers are numbered, for example, from n=0 to n=4 in order of decreasing distance from the intermediate layer 26. Then, in a range from n=0 to n=3, the thicknesses of the high-refractive-index layers 27h are given as $t_h(n)=[\lambda_s+n(\lambda_l-\lambda_s)/3]/(4n_h)$, and the thicknesses of the low-refractive-index layers 27l are given as $t_l(n)=[\lambda_s+n(\lambda_l-\lambda_s)/3]/(4n_l)$. When n=4, the thickness of the high-refractive-index layer 27h is given as $\lambda_l/(4n_h)$, and the thickness of the low-refractive-index layer 27l is given as $\lambda_l/(4n_l)$. That is, in the range from n=0 to n=3, there are linear changes in thickness of the high-refractive-index layers 27h and thickness of the low-refractive-index layers 27l, and the thickness of the high-refractive-index layer 27h and the thickness of the low-refractive-index layer 27l at the time that n=4 are equal to the thickness of the high-refractive-index layer 27h and the thickness of the low-refractive-index layer 27l at the time that n=3, respectively. In other words, in the first reflective layer 28a, one of the plurality of low-refractive-index layers 27l that is closest to the intermediate layer 26 and one of the plurality of low-refractive-index layers 27l that is second closest to the intermediate layer 26 are equal in thickness to each other. In the first reflective layer 28a, one of the plurality of high-refractive-index layers 27h that is closest to the intermediate layer 26 and one of the plurality of high-refractive-index layers 27h that is second closest to the intermediate layer 26 are equal in thickness to each other. Similarly, in the second reflective layer 28b, one of the plurality of low-refractive-index layers 27l that is closest to the intermediate layer 26 and one of the plurality of low-refractive-index layers 27l that is second closest to the intermediate layer 26 are equal in thickness to each other. In the second reflective layer 28b, one of the plurality of high-refractive-index layers 27h that is closest to the intermediate layer 26 and one of the plurality of high-refractive-index layers 27h that is second closest to the intermediate layer 26 are equal in thickness to each other. Thus, in the first reflective layer 28a, the plurality of low-refractive-index layers 27l include a low-refractive-index layer 27l having a first film thickness and a portion in which a low-refractive-index layer 27l having a second film thickness that is greater than the first film thickness is repeated twice or more. In the second reflective layer 28b, the plurality of low-refractive-index layers 27l include a low-refractive-index layer 27l having a third film thickness and a portion in which a low-refractive-index layer 27l having a fourth film thickness that is greater than the third film thickness is repeated twice or more. The same applies to the plurality of high-refractive-index layers 27h in the first reflective layer 28a and the second reflective layer 28b.

As noted above, the thicknesses of the high-refractive-index layers 27h and the low-refractive-index layers 27l are non-linearly modulated as a whole. In the example shown in FIG. 9A as compared with the example shown in FIG. 8A, one pair layer having thicknesses whose optical lengths are $\lambda_l/4$ is newly added between each of the first and second reflective layers 28a and 28b and the intermediate layer 26. This causes long-wavelength light to be more strongly reflected than in the example shown in FIG. 8A by two pair layers near the intermediate layer 26 that have thicknesses whose optical lengths are $\lambda_l/4$. As a result, the time during which the long-wavelength light is confined in the filter 100 becomes longer. For this reason, it is expected that the line width of a peak close to the longest wavelength $\lambda_e$ will become narrower.

Figure 9B:
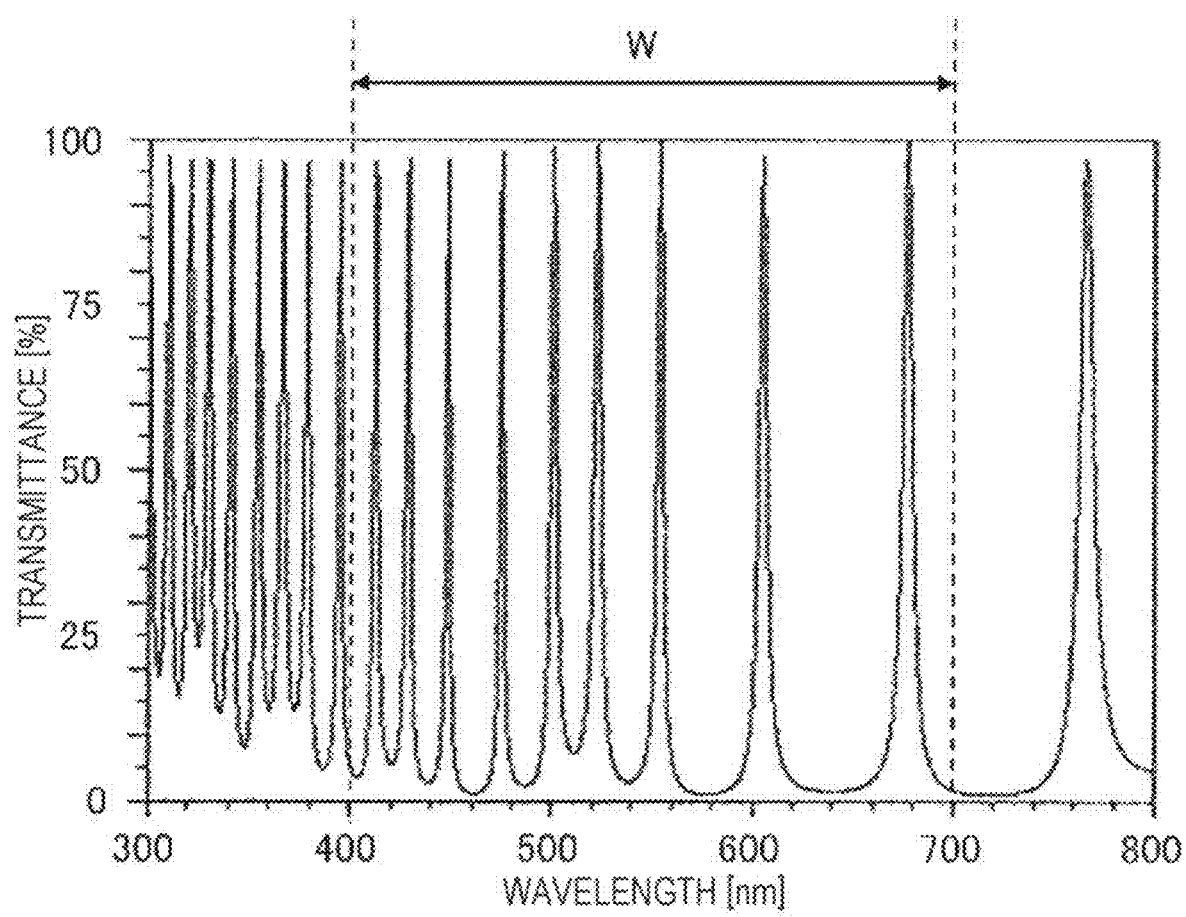
FIG. 9B is a diagram showing the transmission spectrum of the Fabry-Perot filter shown in FIG. 9A.

FIG. 9B is a diagram showing the transmission spectrum of the filter 100 shown in FIG. 9A. In the example shown in FIG. 9B, unlike in the example shown in FIG. 8B, the line width of a peak close to the longest wavelength $\lambda_e$ is narrow. Thus, a dielectric multi-layer film in which the thicknesses of a plurality of pair layers are non-linearly modulated improves the uniformity in line width of the plurality of peaks in the target wavelength region W.

Although, in the example shown in FIG. 9B, the dielectric multi-layer film has one pair layer newly added to a plurality of pair layers whose thicknesses are linearly modulated, such a structure is not intended to impose any limitation. For example, in each of the first and second reflective layers 28a and 28b, there may be an asymptotic increase from $\lambda_s/4$ to $\lambda_e/4$ in optical length of the thicknesses of the plurality of pair layers toward the intermediate layer 26. In other words, there may be a gradual decrease in the rate of increase in optical length of the thicknesses of the plurality of pair layers toward the intermediate layer 26.

In at least a part, not the whole, of the first reflective layer 28a, there may be a gradual decrease in thickness of the plurality of low-refractive-index layers 27l and thickness of the plurality of high-refractive-index layers 27h along a direction away from the intermediate layer 26 toward the plane of incidence. Similarly, in at least a part, not the whole, of the second reflective layer 28b, there may be a gradual decrease in thickness of the plurality of low-refractive-index layers 27l and thickness of the plurality of high-refractive-index layers 27h along a direction away from the intermediate layer 26 toward the substrate 80.

The following describes a relationship between a direction of change in thickness of a plurality of pair layers in a dielectric multi-layer film and the number of peaks in the target wavelength region W.

Figure 10A:
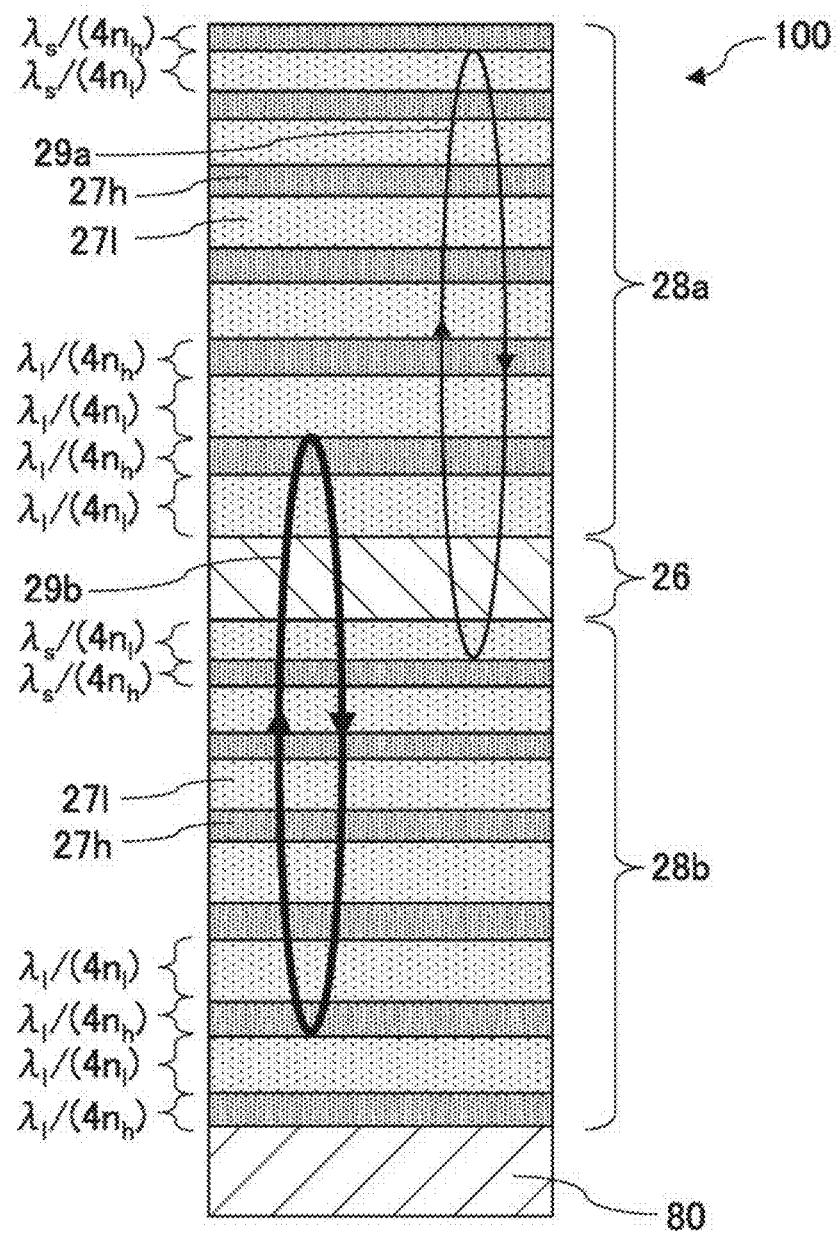
FIG. 10A is a diagram schematically showing a first example of a Fabry-Perot filter including a dielectric multi-layer film in which the thicknesses of a plurality of pair layers are non-linearly modulated.

FIGS. 10A to 10D are diagrams each schematically showing an example of a filter 100 that is a Fabry-Perot filter including a dielectric multi-layer film in which the thicknesses of a plurality of pair layers are non-linearly modulated in different directions. FIG. 10B is identical to FIG. 9A.

In the example shown in FIG. 10A, there is a non-linear increase in thickness of a plurality of pair layers in the first reflective layer 28a from the plane of incidence toward the intermediate layer 26, and there is a non-linear increase in thickness of a plurality of pair layers in the second reflective layer 28b from the intermediate layer 26 toward the substrate 80. As indicated by the first loop 29a, the light of the wavelength $\lambda_s$ is confined by a pair layer in the first reflective layer 28a that faces the plane of incidence and a pair layer in the second reflective layer 28b that faces the intermediate layer 26. As indicated by the second loop 29b, the light of the wavelength $\lambda_l$ is confined by a pair layer in the first reflective layer 28a that faces the intermediate layer 26 and a pair layer in the second reflective layer 28b that faces the substrate 80.

In the example shown in FIG. 10B, there is a non-linear increase in thickness of a plurality of pair layers in the first reflective layer 28a from the plane of incidence toward the intermediate layer 26, and there is a non-linear decrease in thickness of a plurality of pair layers in the second reflective layer 28b from the intermediate layer 26 toward the substrate 80. As indicated by the first loop 29a, the light of the wavelength $\lambda_s$ is confined by a pair layer in the first reflective layer 28a that faces the plane of incidence and a pair layer in the second reflective layer 28b that faces the substrate 80. As indicated by the second loop 29b, the light of the wavelength $\lambda_l$ is confined by a pair layer in the first reflective layer 28a that faces the intermediate layer 26 and a pair layer in the second reflective layer 28b that faces the intermediate layer 26.

Figure 10C:
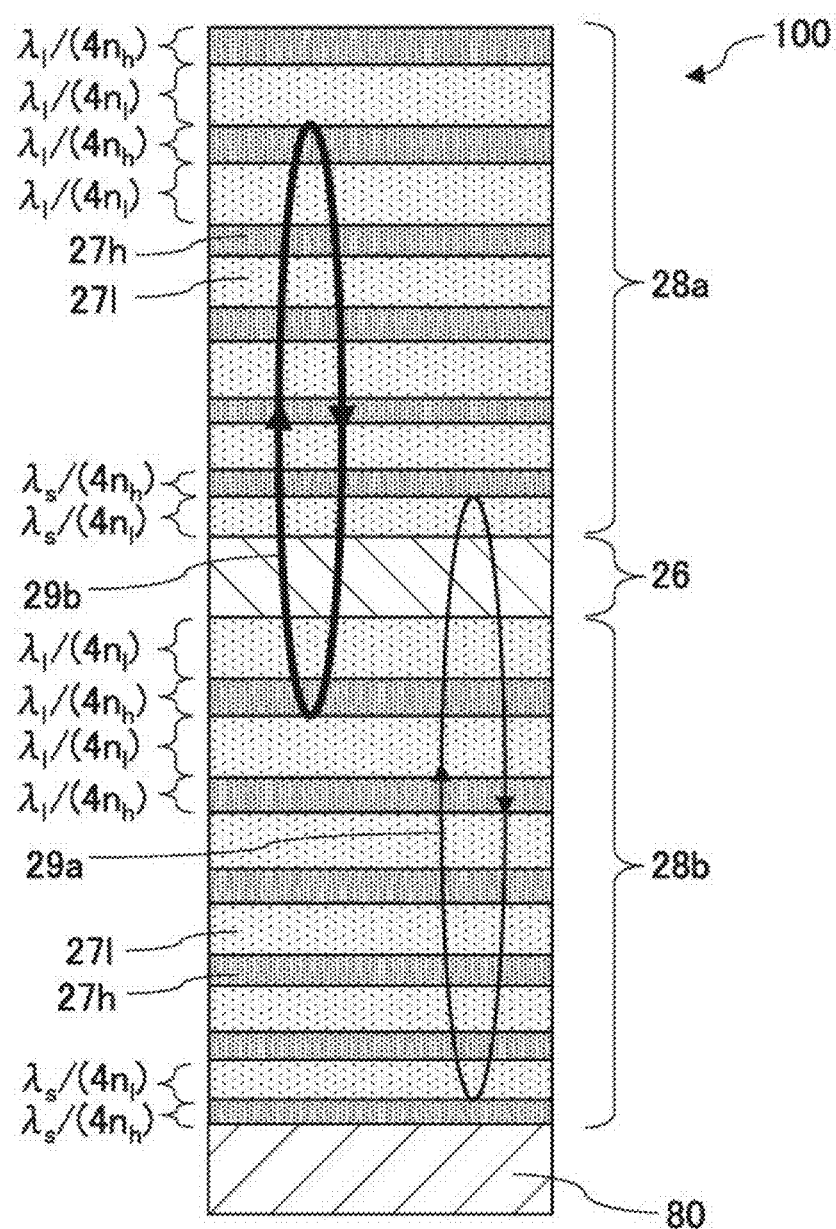
FIG. 10C is a diagram schematically showing a third example of a Fabry-Perot filter including a dielectric multilayer film in which the thicknesses of a plurality of pair layers are non-linearly modulated.

In the example shown in FIG. 10C, there is a non-linear decrease in thickness of a plurality of pair layers in the first reflective layer 28a from the plane of incidence toward the intermediate layer 26, and there is a non-linear decrease in thickness of a plurality of pair layers in the second reflective layer 28b from the intermediate layer 26 toward the substrate 80. As indicated by the first loop 29a, the light of the wavelength $\lambda_s$ is confined by a pair layer in the first reflective layer 28a that faces the intermediate layer 26 and a pair layer in the second reflective layer 28b that faces the substrate 80. As indicated by the second loop 29b, the light of the wavelength $\lambda_l$ is confined by a pair layer in the first reflective layer 28a that faces the plane of incidence and a pair layer in the second reflective layer 28b that faces the intermediate layer 26.

Figure 10D:
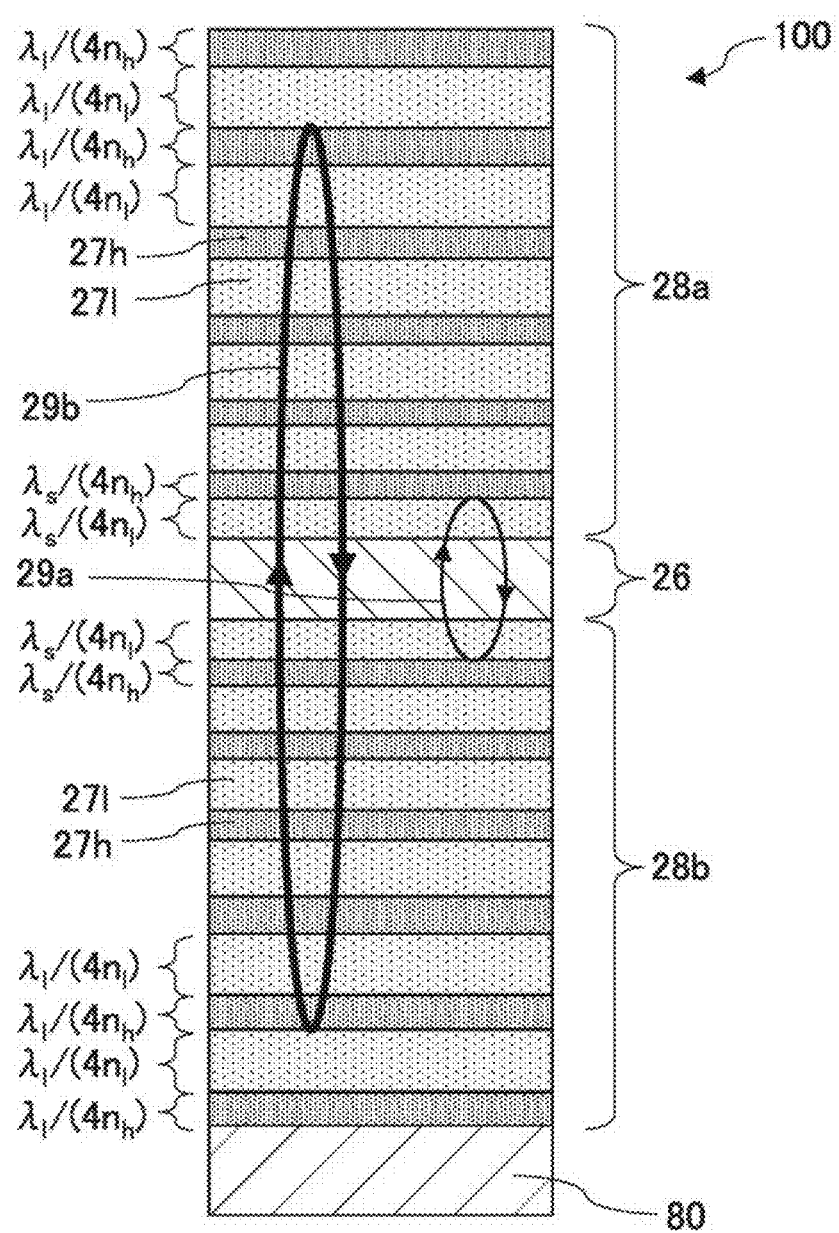
FIG. 10D is a diagram schematically showing a fourth example of a Fabry-Perot filter including a dielectric multilayer film in which the thicknesses of a plurality of pair layers are non-linearly modulated.

In the example shown in FIG. 10D, there is a non-linear decrease in thickness of a plurality of pair layers in the first reflective layer 28a from the plane of incidence of light toward the intermediate layer 26, and there is a non-linear increase in thickness of a plurality of pair layers in the second reflective layer 28b from the intermediate layer 26 toward the substrate 80. As indicated by the first loop 29a, the light of the wavelength $\lambda_s$ is confined by a pair layer in the first reflective layer 28a that faces the intermediate layer 26 and a pair layer in the second reflective layer 28b that faces the intermediate layer 26. As indicated by the second loop 29b, the light of the wavelength $\lambda_l$ is confined by a pair layer in the first reflective layer 28a that faces the plane of incidence and a pair layer in the second reflective layer 28b that faces the substrate 80. At this point in time, there is a difference in optical length of an intermediate layer between the light of the wavelength $\lambda_s$ and the light of the wavelength $\lambda_l$. That is, in the case of the light of the wavelength $\lambda_s$, only the intermediate layer 26 serves as an intermediate layer of the Fabry-Perot filter, and in the case of the light of the wavelength $\lambda_l$, an area sandwiched between the pair layer in the first reflective layer 28a that faces the plane of incidence and the pair layer in the second reflective layer 28b that faces the substrate 80 serves as a substantive intermediate layer of the Fabry-Perot filter. That is, in the case of light of a longer wavelength, the optical length of an intermediate layer of the Fabry-Perot filter is longer; therefore, an expansion in peak interval proportional to the square of the wavelength and a shrinkage in peak interval due to a reduction in reciprocal of the optical length of the intermediate layer cancel each other out, so that there is improvement in the uniformity in interval of the plurality of peaks in the target wavelength region W.

As shown in FIGS. 10A to 10D, the incident light is reflected by pair layers in the first reflective layer 28a and the second reflective layer 28b that correspond to the wavelength of the incident light. This causes an area within the filter 100 in which the incident light is confined to vary depending on the wavelength of the incident light. That is, the substantive thickness of the intermediate layer 26 can be varied according to the wavelength of the incident light by modulating the thicknesses of the plurality of pair layers.

Figure 11A:
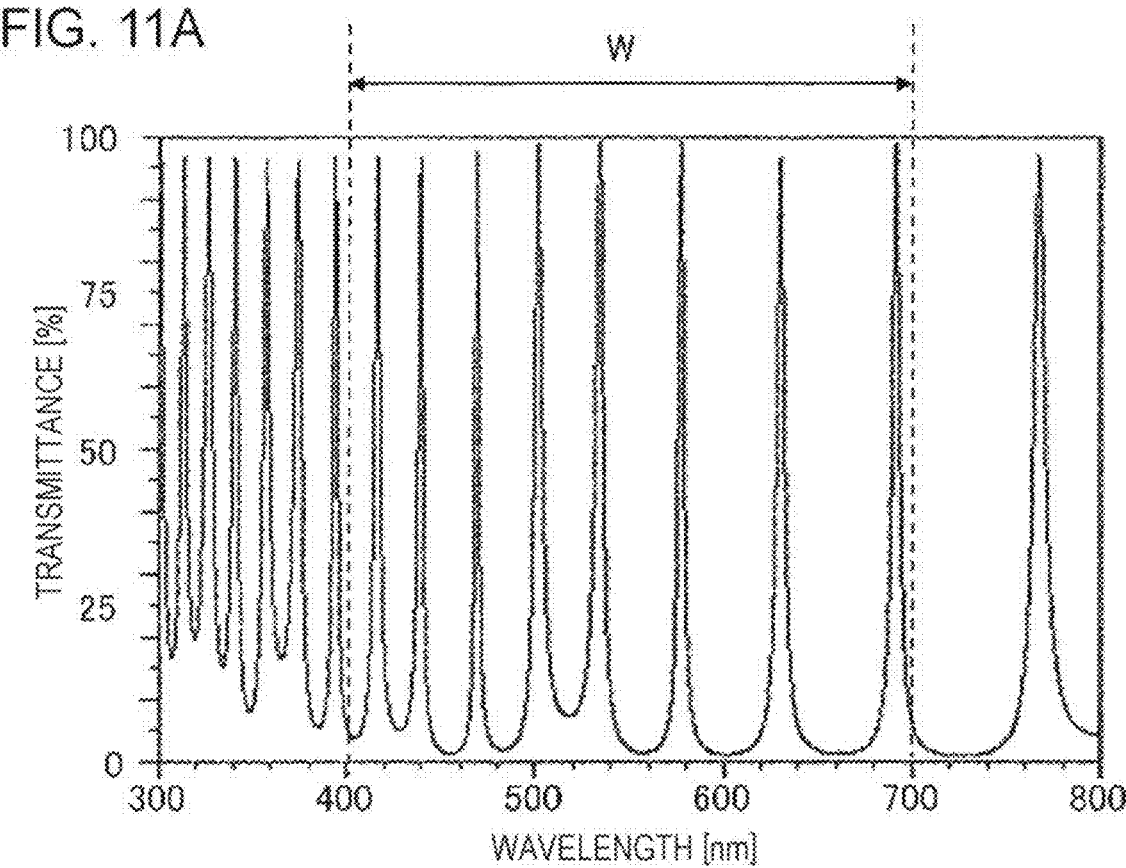
FIG. 11A is a diagram showing the transmission spectrum of the Fabry-Perot filter shown in FIG. 10A.
Figure 11B:
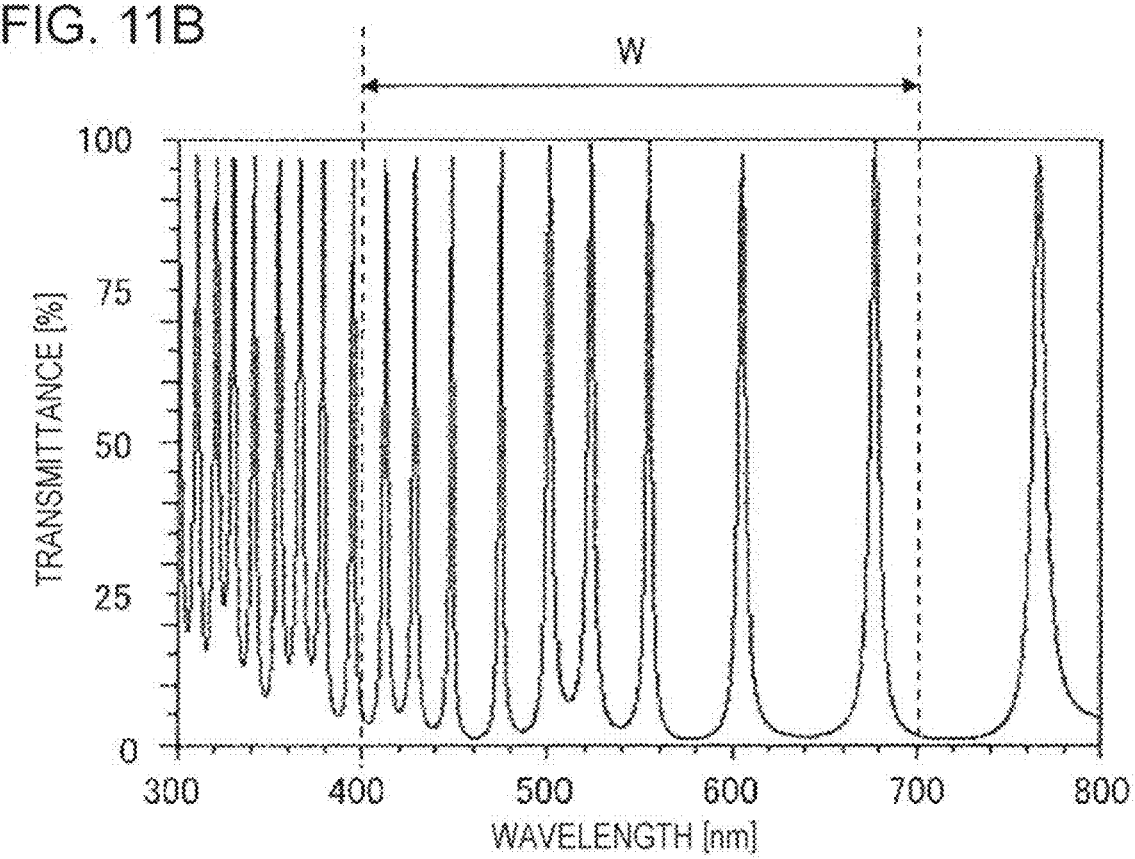
FIG. 11B is a diagram showing the transmission spectrum of the Fabry-Perot filter shown in FIG. 10B.
Figure 11C:
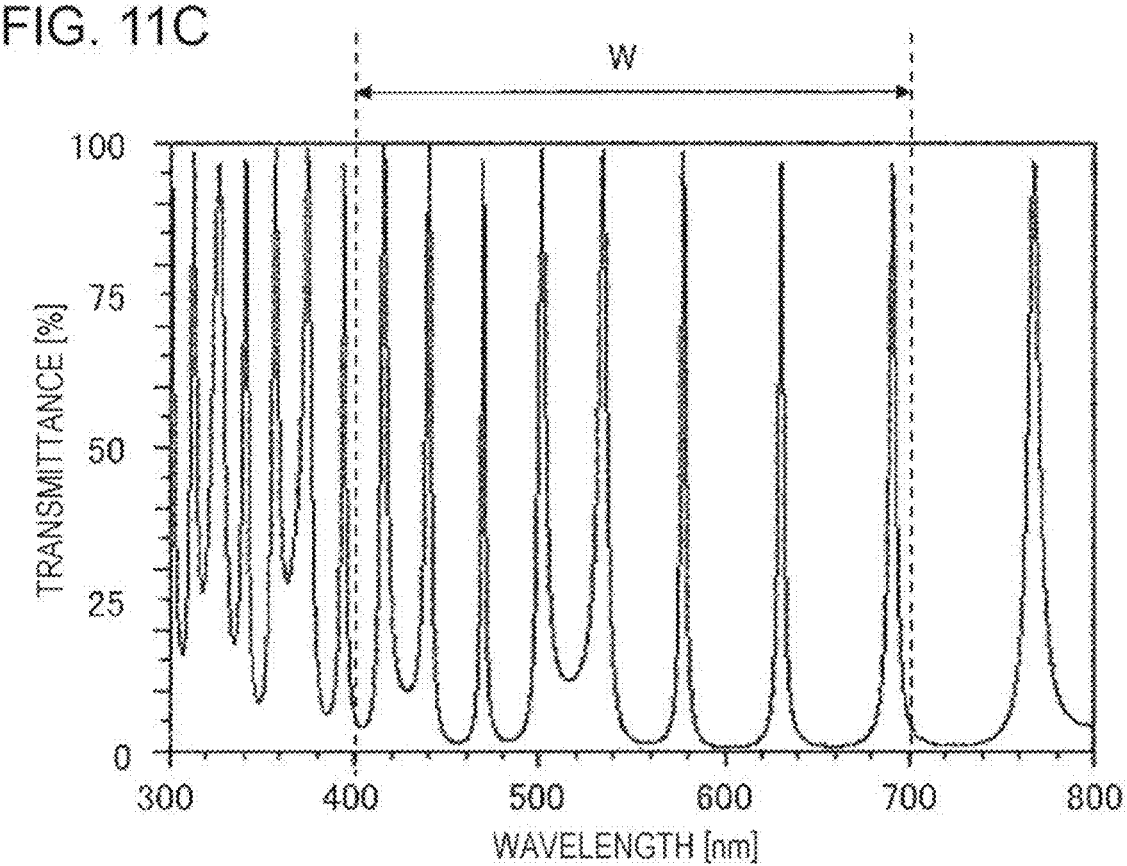
FIG. 11C is a diagram showing the transmission spectrum of the Fabry-Perot filter shown in FIG. 10C.
Figure 11D:
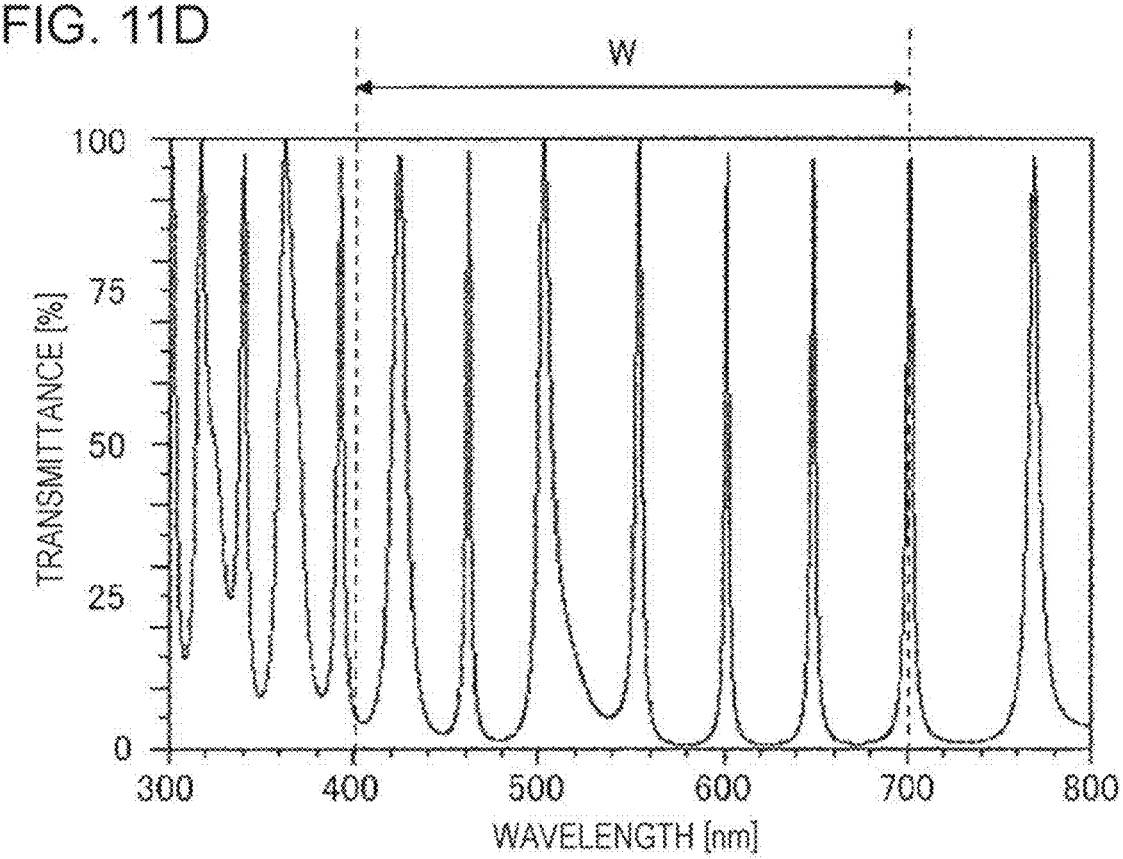
FIG. 11D is a diagram showing the transmission spectrum of the Fabry-Perot filter shown in FIG. 10D.

FIGS. 11A to 11D are diagrams showing the transmission spectra of the filters 100 shown in FIGS. 10A to 10D, respectively. FIG. 11B is identical to FIG. 9B. In the examples shown in FIGS. 11A to 11D, the numbers of peaks in the target wavelength regions W are 8, 9, 8, and 7, respectively. This makes it possible to obtain the largest number of peaks in the target wavelength region W when there is a non-linear decrease in thickness of the plurality of pair layers in a direction from the intermediate layer 26 toward the outside in each of the first and second reflective layers 28a and 28b.

Table 1 shows a relationship between changes in thickness of the plurality of pair layers in the first reflective layer 28a and the second reflective layer 28b and the number of peaks in the target wavelength region W.

TABLE 1

| | First reflective layer (Plane of incidence to intermediate layer) | Second reflective layer (Intermediate layer to substrate) | Number of peaks in target wavelength region |
|---|---|---|---|
| FIG. 10A | Increase in thickness | Increase in thickness | 8 |
| FIG. 10B | Increase in thickness | Decrease in thickness | 9 |
| FIG. 10C | Decrease in thickness | Decrease in thickness | 8 |
| FIG. 10D | Decrease in thickness | Increase in thickness | 7 |

When each of the filters 100 included in the filter array 100C has a large number of peaks in the target wavelength region W, the separate images 220 can be reconstructed with a higher degree of accuracy. Indeed, as mentioned above, according to Formula (3), an increase in the thickness L of the intermediate layer 26 leads to an increase in the number of peaks in the target wavelength region W. However, thickening the intermediate layer 26 leads to an increase in aspect ratio of the filters 100 in the photodetection device 300. Such a photodetection device 300 may not be easy to fabricate. In this respect, the photodetection device 300 can be more easily fabricated by increasing the number of peaks in the target wavelength region W by adjusting the direction of change in thickness of the plurality of pair layers in the dielectric multi-layer film.

As noted above, the uniformity in line width of the plurality of peaks in the target wavelength region W can be improved by linearly or non-linearly modulating the thicknesses of the plurality of pair layers in the dielectric multi-layer film. This makes it possible to improve the spatial resolution and wavelength resolution of a hyperspectral camera.

The following describes modifications of the photodetection device 300 shown in FIG. 5.

FIGS. 12A to 12F are diagrams schematically showing modifications of the photodetection device 300 shown in FIG. 5.

Figure 12A:
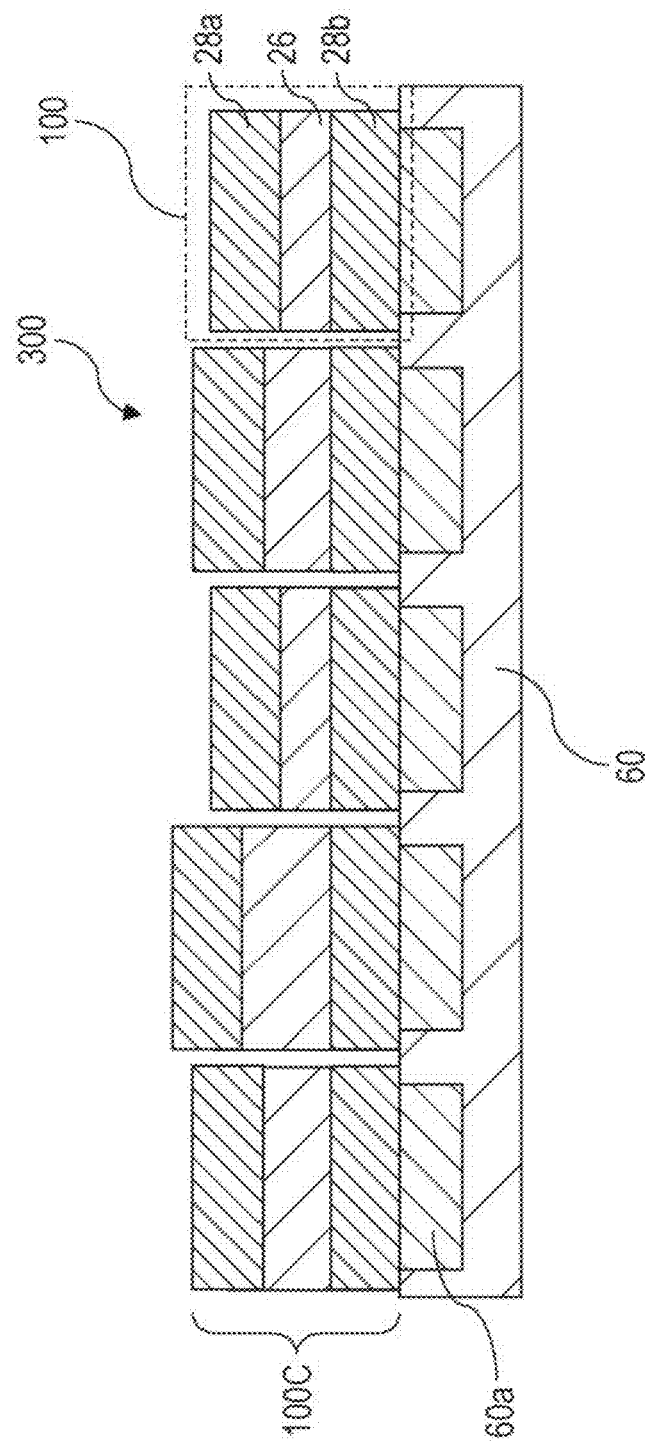
FIG. 12A is a diagram schematically showing a first modification of the photodetection device shown in FIG. 5.

As shown in FIG. 12A, in the filter array 100C, the plurality of filters 100 may be divided from each other. Not all filters 100 need to be divided from each other. Some filters 100 may be divided from each other.

Figure 12B:
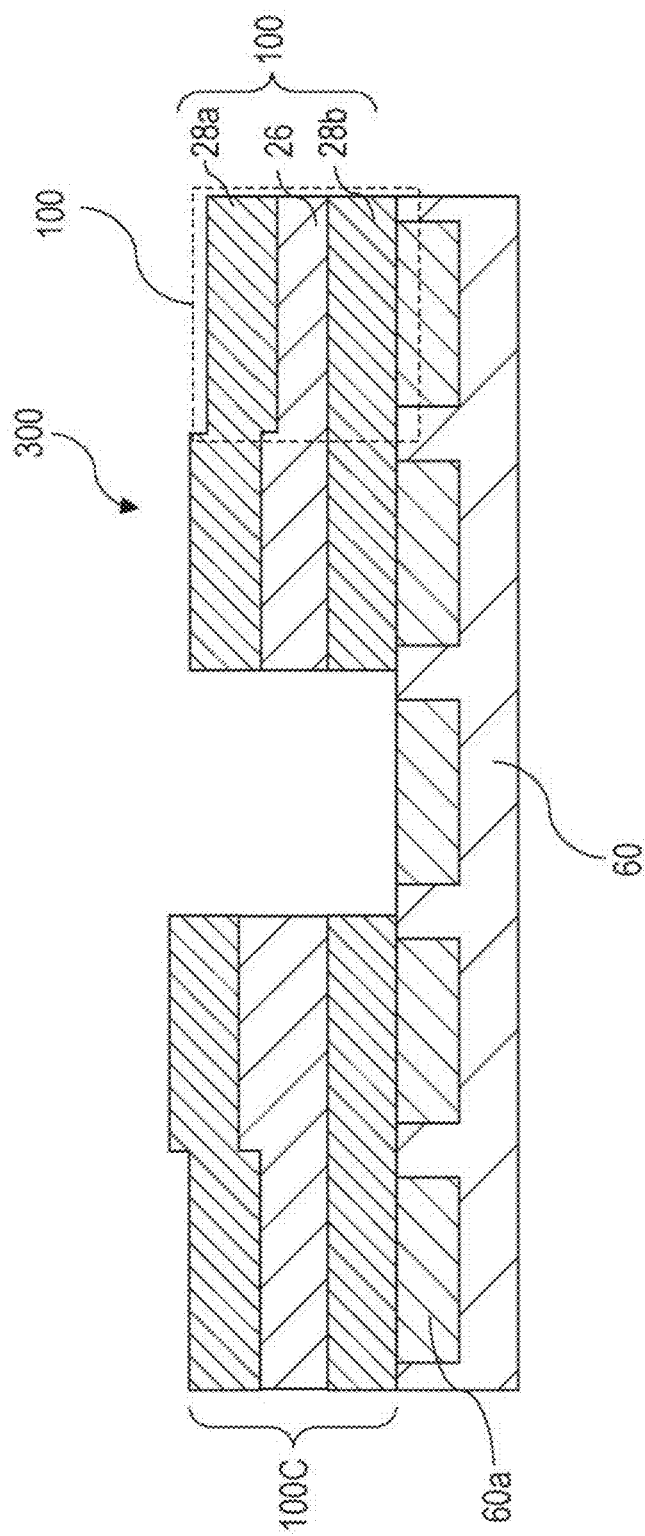
FIG. 12B is a diagram schematically showing a second modification of the photodetection device shown in FIG. 5.

As shown in FIG. 12B, no filters 100 may be disposed above some pixels. In other words, in the filter array 100C, at least one of the plurality of filters 100 may be transparent.

Figure 12C:
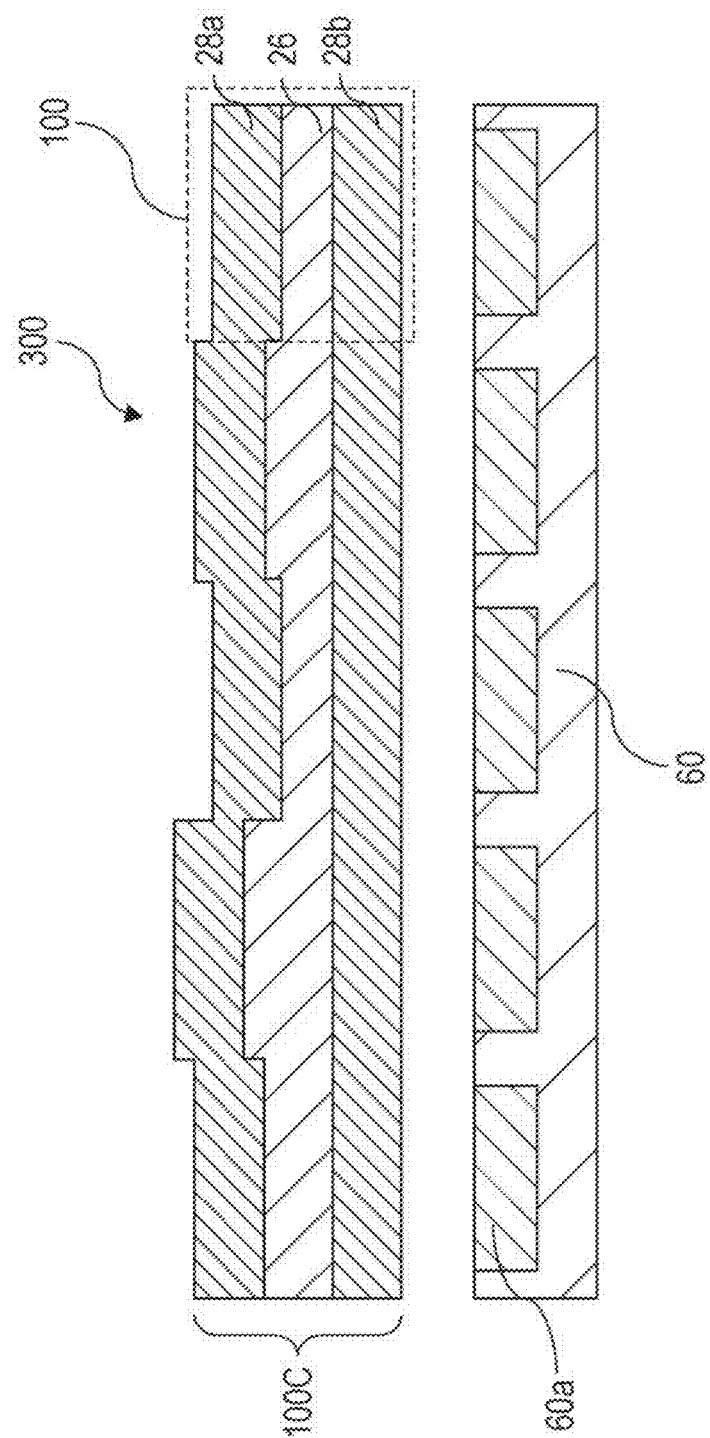
FIG. 12C is a diagram schematically showing a third modification of the photodetection device shown in FIG. 5.

As shown in FIG. 12C, a space may be provided between the filter array 100C and the image sensor 60. In other words, the filter array 100C and the image sensor 60 may be separated from each other by a space.

Figure 12D:
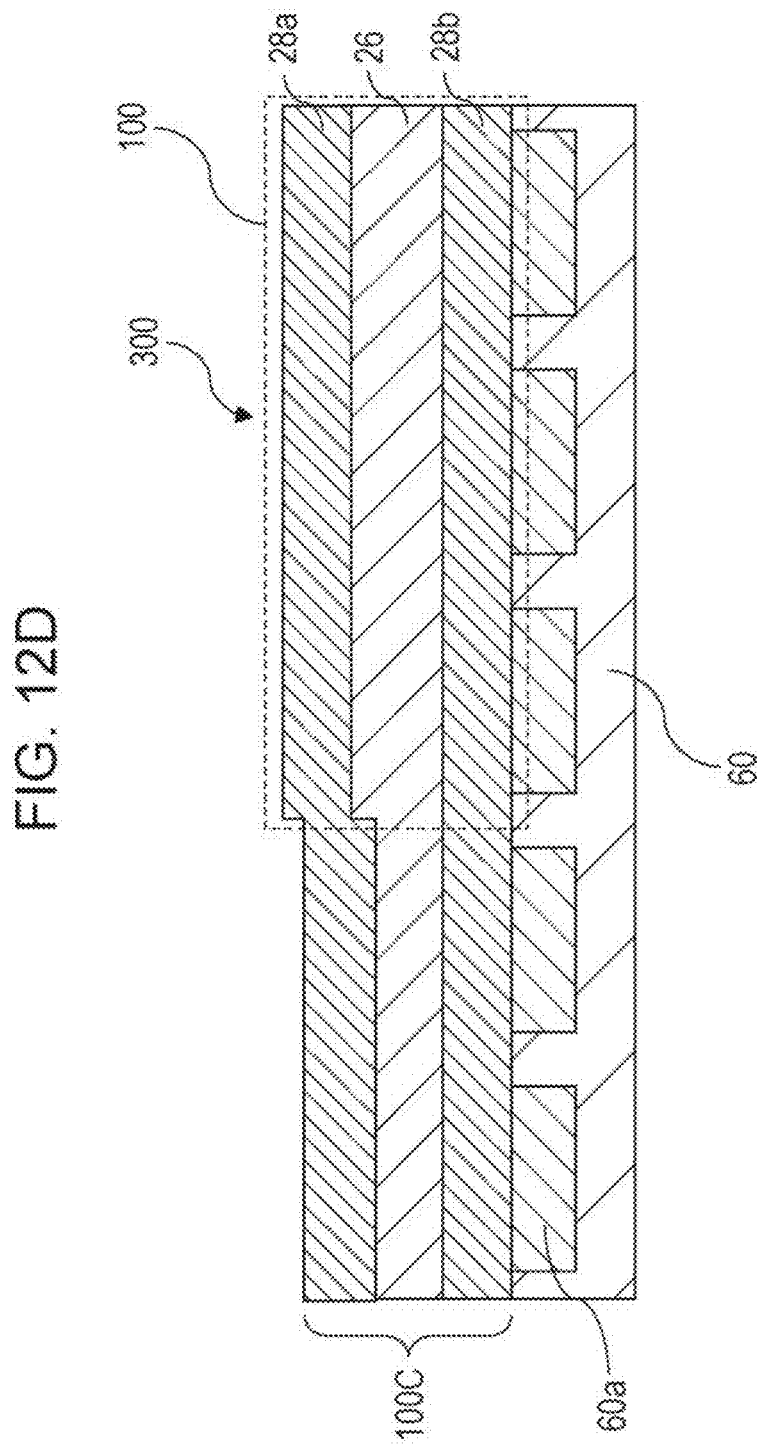
FIG. 12D is a diagram schematically showing a fourth modification of the photodetection device shown in FIG. 5.

As shown in FIG. 12D, one filter 100 may be disposed over a plurality of pixels. In other words, the intermediate layer 26 is continuously provided over two or more pixels. The first reflective layer 28a and/or the second reflective layer 28b may be continuously provided across two or more filters 100.

Figure 12F:
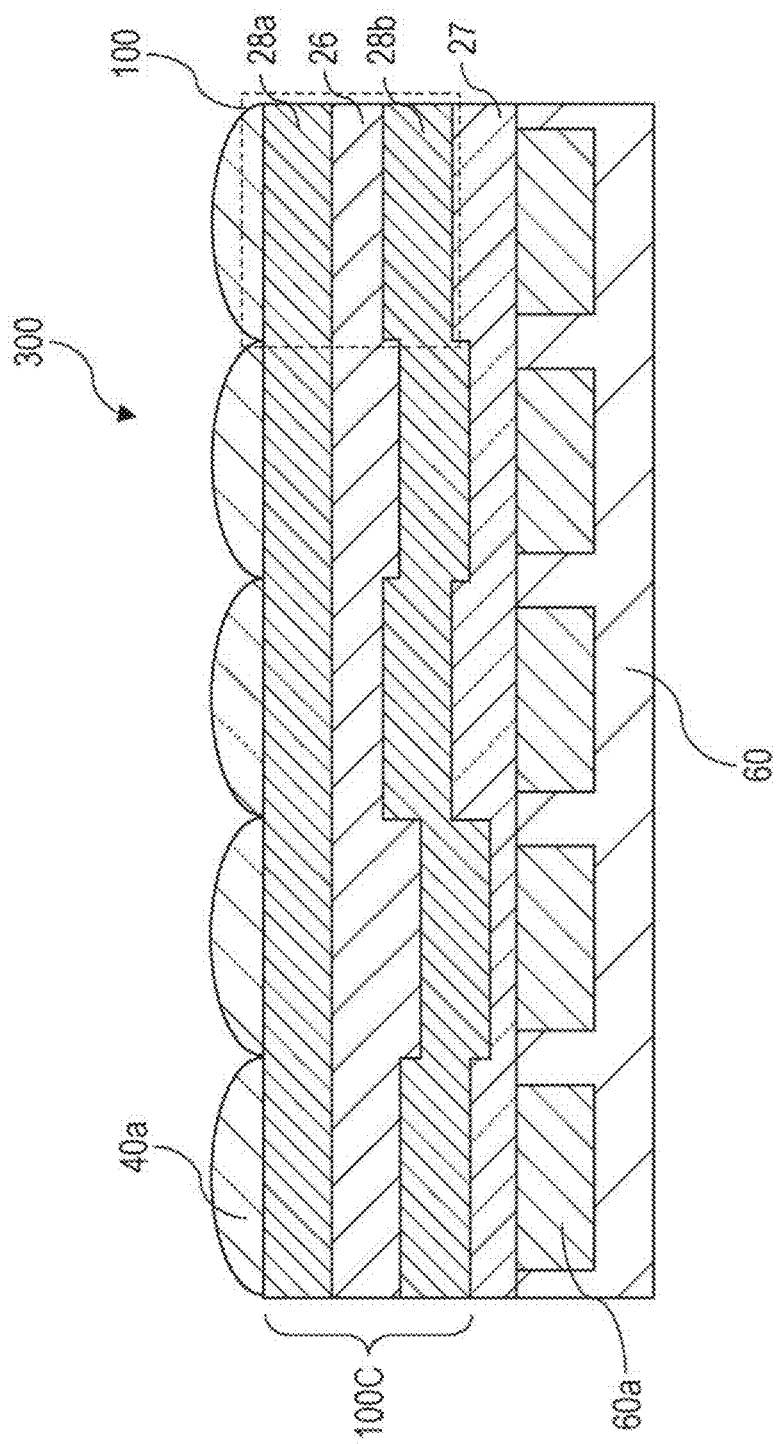
FIG. 12F is a diagram schematically showing a sixth modification of the photodetection device shown in FIG. 5.

As shown in FIGS. 12E and 12F, a transparent layer 27 may be disposed to planarize level differences on the filter array 100C. In other words, the filter array 100C may further include a transparent layer 27 that planarizes level differences on two or more filters 100 including the aforementioned resonant structure. In the example shown in FIG. 12E, there are level differences on an upper surface of the second reflective layer 28b of the filter array 100C. In the example shown in FIG. 12F, there are level differences on a lower surface of the first reflective layer 28a of the filter array 100C. The planarization of level differences on two or more filters 100 by the transparent layer 27 makes it easy to dispose another member on the transparent layer 27.

As shown in FIGS. 12E and 12F, a plurality of microlenses 40a may be disposed on the filter array 100C. Each of the plurality of microlenses 40a is disposed on one of the plurality of filters 100. In other words, the filter array 100C further includes two or more microlenses 40a. Each of the two or more microlenses 40a is disposed on one of two or more filters 100 including the aforementioned resonant structure. Condensation of incident light by the two or more microlenses 40a makes it possible to efficiently detect light.

A photodetection device and a filter array according to the present disclosure are useful, for example, in a camera and a measuring instrument that acquire a multiwavelength two-dimensional image. The photodetection device and the filter array according to the present disclosure are also applicable, for example, to biological, medical, and aesthetic sensing, food foreign material and residual pesticide testing systems, remote sensing systems, and on-board sensing systems.

What is claimed is:

1. A photodetection device comprising:
    a filter array including a plurality of filters arranged in a two-dimensional array, the plurality of filters including a first filter and a second filter, the first filter and the second filter each including a first reflective layer, a second reflective layer, and an intermediate layer between the first reflective layer and the second reflective layer and having a resonant structure, a transmission spectrum of each of the first filter and the second filter being different from each other and having local maximum values of transmittance; and
    an image sensor disposed at a position where the image sensor receives light having passed through the filter array, wherein:
    the first reflective layer includes:
        a plurality of first dielectric layers each having a first refractive index, and
        a plurality of second dielectric layers each having a second refractive index that is higher than the first refractive index,
    the plurality of first dielectric layers and the plurality of second dielectric layers are alternately disposed in the first reflective layer,
    at least two of the plurality of first dielectric layers have thicknesses differing from each other,
    at least two of the plurality of second dielectric layers have thicknesses differing from each other,
    the second reflective layer includes:
        a plurality of third dielectric layers each having a third refractive index, and
        a plurality of fourth dielectric layers each having a fourth refractive index that is higher than the third refractive index,
    the plurality of third dielectric layers and the plurality of fourth dielectric layers are alternately disposed in the second reflective layer,
    at least two of the plurality of third dielectric layers have thicknesses differing from each other,
    at least two of the plurality of fourth dielectric layers have thicknesses differing from each other,
    one end layer of the second reflective layer is in direct contact with the intermediate layer and another end layer of the second reflective layer is in direct contact with a substrate,
    in at least a part of the first reflective layer, a thickness of each of the plurality of first dielectric layers and a thickness of each of the plurality of second dielectric layers gradually decrease along a first direction away from the intermediate layer, and
    in an entirety of the second reflective layer, a thickness of each of the plurality of third dielectric layers and a thickness of each of the plurality of fourth dielectric layers gradually decrease along the first direction.

2. The photodetection device according to claim 1, wherein:
    the resonant structure comprises a plurality of resonant modes,
    the image sensor outputs an image signal to a signal processing circuit configured to generate a plurality of images based on the signal, each of the plurality of images corresponding to a plurality of wavelength bands, and
    the local maximum values of transmittance correspond to the plurality of resonant modes, respectively.

3. A photodetection system comprising:
    the photodetection device according to claim 2; and
    the signal processing circuit.

4. The photodetection device according to claim 1, wherein
    an optical length of each of the plurality of first dielectric layers is equal to an optical length of one of the plurality of second dielectric layers adjacent to each of the plurality of first dielectric layers,
    an optical length of each of the plurality of third dielectric layers is equal to an optical length of one of the plurality of fourth dielectric layers adjacent to each of the plurality of third dielectric layers, and an optical length of a given layer is calculated by multiplying a thickness with a refractive index of the given layer.

5. The photodetection device according to claim 1, wherein:
the plurality of first dielectric layers include a first dielectric layer having a first film thickness and two first dielectric layers each having a second film thickness that is greater or smaller than the first film thickness,
the two first dielectric layers are continuously disposed so that one of the plurality of second dielectric layers is disposed between the two first dielectric layers,
the plurality of third dielectric layers include a third dielectric layer having a third film thickness and two third dielectric layers each having a fourth film thickness that is greater or smaller than the third film thickness, and
the two third dielectric layers are continuously disposed so that one of the plurality of fourth dielectric layers is disposed between the two third dielectric layers.

6. The photodetection device according to claim 1, wherein
the first refractive index is equal to the third refractive index, and
the second refractive index is equal to the fourth refractive index.

7. The photodetection device according to claim 1, wherein the intermediate layer contains at least one selected from the group consisting of silicon, silicon nitride, titanium oxide, niobium oxide, and tantalum oxide.

8. The photodetection device according to claim 1, wherein:
the second reflective layer is disposed between the intermediate layer and the image sensor, and
a surface of the second reflective layer that is opposed to the image sensor has level difference between the first filter and the second filter.

9. The photodetection device according to claim 1, wherein:
the resonant structure comprises a plurality of resonant modes,
each of the transmission spectrum of the first filter and the second filter is such that light passing through each of the first filter and the second filter has a plurality of peaks as the local maximum values,
the plurality of peaks corresponds to the resonant modes, respectively, and
the image sensor includes a first pixel that detects the plurality of peaks included in the light passing through the first filter and a second pixel that detects the plurality of peaks included in the light passing through the second filter.

10. A filter array comprising:
a plurality of filters arranged in a two-dimensional array, wherein:
the plurality of filters includes a first filter and a second filter,
the first filter and the second filter each include a first reflective layer, a second reflective layer, and an intermediate layer between the first reflective layer and the second reflective layer and having a resonant structure,
a transmission spectrum of each of the first filter and the second filter being different from each other and having local maximum values of transmittance, and
the first reflective layer includes:
a plurality of first dielectric layers each having a first refractive index, and
a plurality of second dielectric layers each having a second refractive index that is higher than the first refractive index,
the plurality of first dielectric layers and the plurality of second dielectric layers are alternately disposed in the first reflective layer,
at least two of the plurality of first dielectric layers have thicknesses differing from each other,
at least two of the plurality of second dielectric layers have thicknesses differing from each other,
the second reflective layer includes:
a plurality of third dielectric layers each having a third refractive index, and
a plurality of fourth dielectric layers each having a fourth refractive index that is higher than the third refractive index,
the plurality of third dielectric layers and the plurality of fourth dielectric layers are alternately disposed in the second reflective layer,
at least two of the plurality of third dielectric layers have thicknesses differing from each other,
at least two of the plurality of fourth dielectric layers have thicknesses differing from each other,
one end layer of the second reflective layer is in direct contact with the intermediate layer and another end layer of the second reflective layer is in direct contact with a substrate,
in at least a part of the first reflective layer, a thickness of each of the plurality of first dielectric layers and a thickness of each of the plurality of second dielectric layers gradually decrease along a first direction away from the intermediate layer, and
in an entirety of the second reflective layer, a thickness of each of the plurality of third dielectric layers and a thickness of each of the plurality of fourth dielectric layers gradually decrease along the first direction.

11. A photodetection device comprising:
a filter array including a plurality of filters arranged in a two-dimensional array, the plurality of filters including a first filter and a second filter, the first filter and the second filter each including a first reflective layer, a second reflective layer, and an intermediate layer between the first reflective layer and the second reflective layer and having a resonant structure, a transmission spectrum of each of the first filter and the second filter being different from each other and has local maximum values of transmittance; and
an image sensor disposed at a position where the image sensor receives light having passed through the filter array, wherein:
the first reflective layer includes:
a plurality of first dielectric layers each having a first refractive index, and
a plurality of second dielectric layers each having a second refractive index that is higher than the first refractive index,
the plurality of first dielectric layers and the plurality of second dielectric layers are alternately disposed in the first reflective layer,
at least two of the plurality of first dielectric layers have thicknesses differing from each other,
at least two of the plurality of second dielectric layers have thicknesses differing from each other,
the second reflective layer includes:
a plurality of third dielectric layers each having a third refractive index, and a plurality of fourth dielectric layers each having a fourth refractive index that is higher than the third refractive index, the plurality of third dielectric layers and the plurality of fourth dielectric layers are alternately disposed in the second reflective layer, at least two of the plurality of third dielectric layers have thicknesses differing from each other, at least two of the plurality of fourth dielectric layers have thicknesses differing from each other, one end layer of the second reflective layer is in direct contact with the intermediate layer and another end layer of the second reflective layer is in direct contact with a substrate, in at least a part of the first reflective layer, a thickness of each of the plurality of first dielectric layers and a thickness of each of the plurality of second dielectric layers gradually increase along a first direction away from the intermediate layer, and in an entirety of the second reflective layer, a thickness of each of the plurality of third dielectric layers and a thickness of each of the plurality of fourth dielectric layers gradually increase along the first direction.

\* \* \* \* \*